US008619085B2

(12) United States Patent
Keall et al.

(10) Patent No.: US 8,619,085 B2
(45) Date of Patent: Dec. 31, 2013

(54) METHOD AND SYSTEM FOR COMPRESSING TILE LISTS USED FOR 3D RENDERING

(75) Inventors: Gary Keall, Long Clawson (GB); Giles Edkins, Cambridge (GB); Eben Upton, Cambridge (GB); James Adams, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 454 days.

(21) Appl. No.: 12/953,128

(22) Filed: Nov. 23, 2010

(65) Prior Publication Data

US 2011/0216069 A1 Sep. 8, 2011

Related U.S. Application Data

(60) Provisional application No. 61/311,640, filed on Mar. 8, 2010.

(51) Int. Cl.
*G06T 11/20* (2006.01)
*G06T 1/00* (2006.01)

(52) U.S. Cl.
USPC .......................................... 345/441; 345/418

(58) Field of Classification Search
None
See application file for complete search history.

(56) References Cited

U.S. PATENT DOCUMENTS

| 6,172,684 | B1 * | 1/2001 | Lapidous ...................... 345/443 |
| 2003/0184555 | A1 * | 10/2003 | Fraser .......................... 345/582 |
| 2005/0030320 | A1 * | 2/2005 | Munshi et al. ................ 345/620 |
| 2009/0225098 | A1 * | 9/2009 | Xu et al. ....................... 345/620 |

OTHER PUBLICATIONS

"The Cg Tutorial", ISBN:9780321545398, Safari Books Online 2007.*
Jang et al. "Fast 3D Mesh Compression Using Shared Vertex Analysis", ETRI Journal vol. 32, No. 1, Feb. 2010.*
McAllister "Triangle Rasterization", Oct. 23, 2007.*

* cited by examiner

*Primary Examiner* — Tize Ma
*Assistant Examiner* — Yingchun He
(74) *Attorney, Agent, or Firm* — Brinks Gilson & Lione

(57) ABSTRACT

A graphics processing device may generate coordinates for vertices of graphics primitives in a view-space. Tiles are defined within the view-space and are associated with tile lists. Primitives and/or vertices which overlap a tile are determined. Tile lists comprise differentially encoded indices and/or spatial coordinates for overlapping primitives. The differential encoding may or may not be byte aligned. During tile mode graphics rendering, tile lists are utilized to reference vertex attributes and/or primitives. Graphics rendering comprises a tile binning phase and a tile rendering phase. The primitives may comprise a triangle and/or joined triangles that share one or more vertices. For multiple joined primitives, information about shared vertices may be encoded without repetition for each primitive. Coordinates and/or corresponding weights for new vertices are encoded in a tile list and utilized for interpolating properties of the new vertices based on attributes of the original vertices.

20 Claims, 8 Drawing Sheets

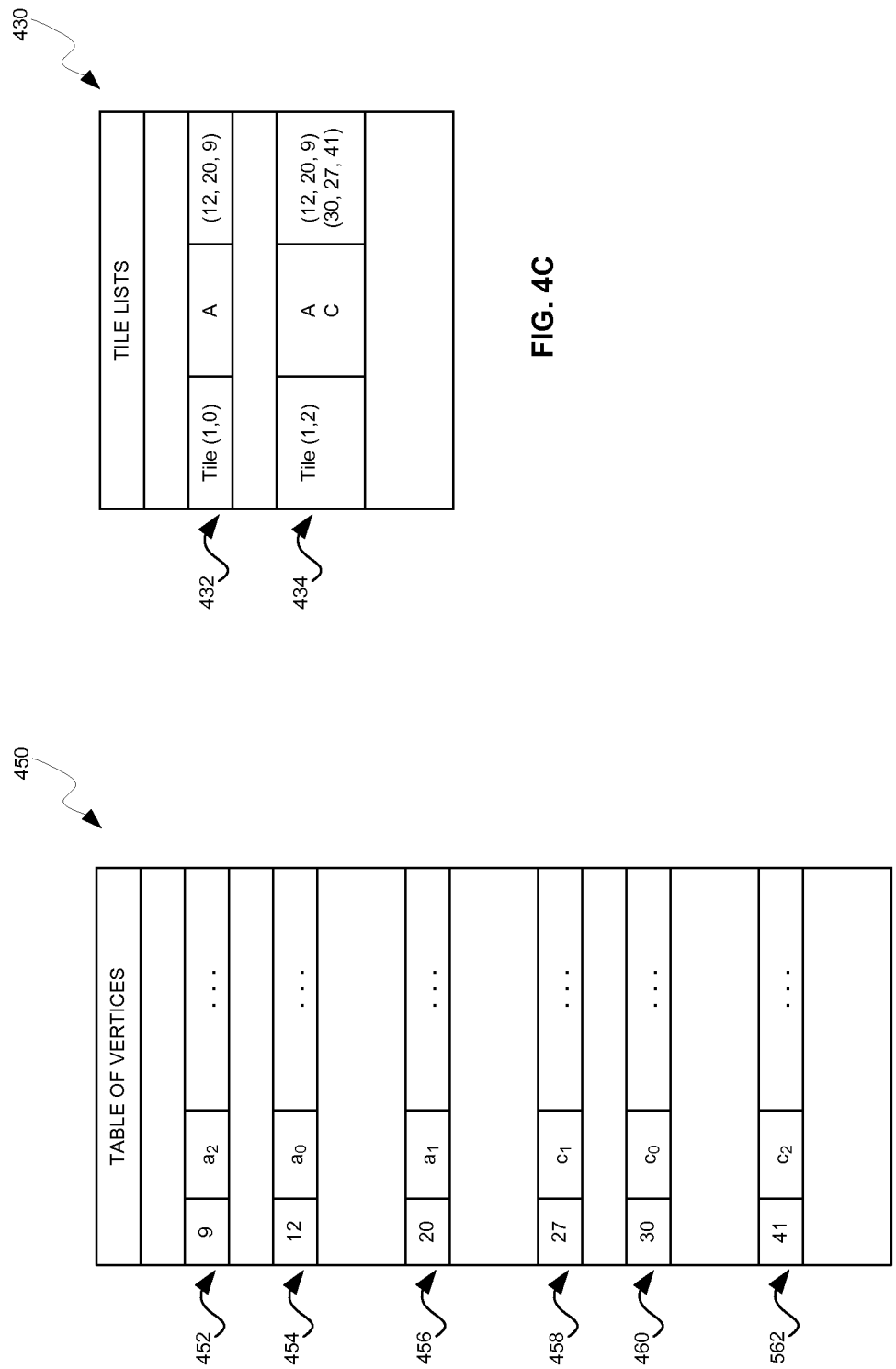

A clipped primitive

A strip of joined triangles

A fan of joined triangles

METHOD AND SYSTEM FOR COMPRESSING TILE LISTS USED FOR 3D RENDERING

CROSS-REFERENCE TO RELATED APPLICATIONS/INCORPORATION BY REFERENCE

This application makes reference to, claims priority to, and claims the benefit of U.S. Provisional Application Ser. No. 61/311,640, filed on Mar. 8, 2010, which is incorporated herein by reference in its entirety.

This application also makes reference to:
U.S. patent application Ser. No. 12/686,800, which was filed on Jan. 13, 2010;
U.S. patent application Ser. No. 12/868,192, which was filed on Aug. 25, 2010;
U.S. patent application Ser. No. 12/953,739 which was filed on Nov. 24, 2010;
U.S. patent application Ser. No. 12/942,626, which was filed on Nov. 9, 2010;
U.S. patent application Ser. No. 12/953,756, which was filed on Nov. 24, 2010;
U.S. patent application Ser. No. 12/869,900, which was filed on Aug. 27, 2010;
U.S. patent application Ser. No. 12/868,508, which was filed on Aug. 25, 2010; and
U.S. patent application Ser. No. 12/835,522, which was filed on Apr. 22, 2010;

Each of the above stated applications is hereby incorporated herein by reference in its entirety.

FIELD OF THE INVENTION

Certain embodiments of the invention relate to communication systems. More specifically, certain embodiments of the invention relate to compressing tile lists used for 3D rendering.

BACKGROUND OF THE INVENTION

Image and video capabilities may be incorporated into a wide range of devices such as, for example, cellular phones, personal digital assistants, digital televisions, digital direct broadcast systems, digital recording devices, gaming consoles and the like. Operating on video data, however, may be very computationally intensive because of the large amounts of data that need to be constantly moved around. This normally requires systems with powerful processors, hardware accelerators, and/or substantial memory, particularly when video encoding is required. Such systems may typically use large amounts of power, which may make them less than suitable for certain applications, such as mobile applications.

Due to the ever growing demand for image and video capabilities, there is a need for power-efficient, high-performance multimedia processors that may be used in a wide range of applications, including mobile applications. Such multimedia processors may support multiple operations including audio processing, image sensor processing, video recording, media playback, graphics, three-dimensional (3D) gaming, and/or other similar operations.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for compressing tile lists used for 3D rendering, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4B is a block diagram that illustrates exemplary vertex information that may be utilized during a tile binning phase and/or during a tile rendering phase, in accordance with an embodiment of the invention.

FIG. 4C is a block diagram that illustrates exemplary index information that may be encoded during a tile binning phase of tile mode graphics rendering, in accordance with an embodiment of the invention.

DETAILED DESCRIPTION OF THE INVENTION

Certain embodiments of the invention can be found in a method and system for compressing tile lists used for 3D rendering. In accordance with various embodiments of the invention, one or more processors and/or circuits in a graphics processing device may be operable to generate coordinates within a view-space for one or more vertices of one or more graphics primitives. Indices that reference information about the one or more vertices of the one or more graphics primitives may be differentially encoded in a list. The information may comprise vertex attributes. Furthermore, spatial coordinates, for example, x,y coordinates of the one or more vertices of the graphics primitives may be differentially encoded in the list. The differentially encoded indices and/or the x,y coordinates may or may not be byte aligned. The list may be utilized to reference the one or more vertices of the one or more graphics primitives during graphics rendering. A plurality of tiles may be defined within the view-space. The list may comprise one or more tile lists. Each tile list may correspond with a tile defined in the view-space.

Which of the graphics primitives and/or vertices that overlap at least a portion of a tile defined within the view-space may be determined. In various instances, a plurality of graphics primitives and/or a plurality of vertices may overlap at least a portion of a tile defined in the view-space. The graphics primitives may comprise a triangle. Moreover, the graphics primitives may comprise joined triangles that share one or more vertices. Indices for vertices and/or vertex coordinates of the joined graphics primitives may be encoded in a list, without repeating the encoding for the shared one or more vertices. In a list that may be associated with a tile defined in the view-space, new view-space coordinates and/or corresponding weights of new vertices may be encoded. The new coordinates and/or the weights may be utilized for interpolating properties of the new vertices based on the information about the one or more vertices and/or the graphics primitives. The graphics rendering may be performed in a tile mode utilizing at least two phases comprising a tile binning phase and a tile rendering phase. During the binning phase coordinate shading may be performed and during the rendering phase full vertex shading may be performed. In this manner memory may be conserved and cache access time may be improved.

Figure 1A:
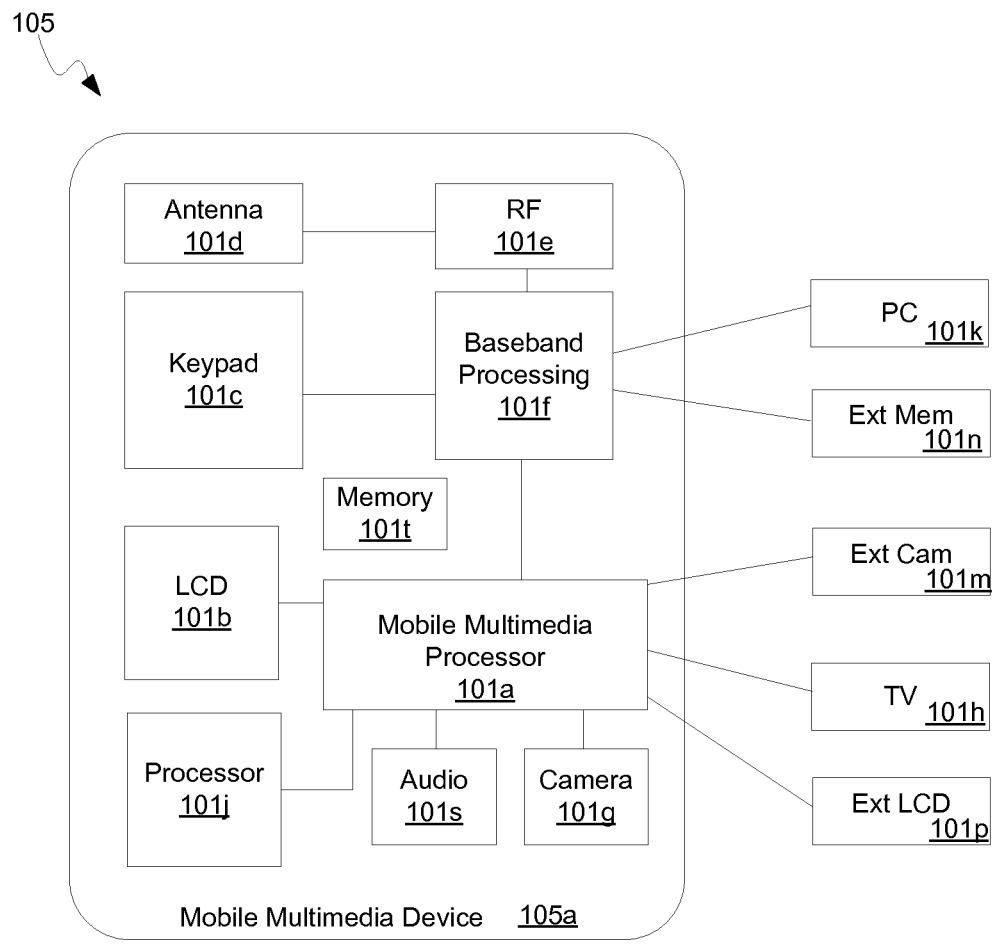
FIG. 1A is a block diagram of an exemplary multimedia system that is operable to compress tile lists for 3D graphics rendering, in accordance with an embodiment of the invention.

FIG. 1A is a block diagram of an exemplary multimedia system that is operable to compress tile lists for 3D graphics rendering, in accordance with an embodiment of the invention. Referring to FIG. 1A, there is shown a mobile multimedia system 105 that comprises a mobile multimedia device 105*a*, a TV 101*h*, a PC 101*k*, an external camera 101*m*, external memory 101*n*, and external LCD display 101*p*. The mobile multimedia device 105*a* may be a cellular telephone or other handheld communication device. The mobile multimedia device 105*a* may comprise a mobile multimedia processor (MMP) 101*a*, a memory 101*t*, a processor 101*j*, an antenna 101*d*, an audio block 101*s*, a radio frequency (RF) block 101*e*, a baseband processing block 101*f*, an LCD display 101*b*, a keypad 101*c*, and a camera 101*g*.

The MMP 101*a* may comprise suitable circuitry, logic, interfaces, and/or code that may be operable to perform video and/or multimedia processing for the mobile multimedia device 105*a*. The MMP 101*a* may also comprise integrated interfaces, which may be utilized to support one or more external devices coupled to the mobile multimedia device 105*a*. For example, the MMP 101*a* may support connections to a TV 101*h*, an external camera 101*m*, and an external LCD display 101*p*. The MMP 101*a* may be communicatively coupled to the memory 101*t* and/or the external memory 101*n*.

The MMP 101*a* may comprise suitable circuitry, logic, interfaces and/or code that may be operable to perform tile based, two dimensional (2D) and/or three dimensional (3D) graphics rendering. The graphics rendering may be performed in two phases, namely a tile binning phase and a tile rendering phase. The tile binning phase may comprise coordinate-only vertex shading, whereas the pixel rendering phase may comprise full vertex shading.

A tile based graphics rendering process may utilize a two dimensional field, in screen space, that may overlay a graphics image. The two dimensional field may be divided into a plurality of regions. The plurality of regions may be referred to as a plurality of tiles or bins. The graphics image may be composed of a plurality of geometric primitives. The MMP 101*a* may determine which primitives, or portions of a primitive, overlap ones of the plurality of tiles (or bins). The MMP 101*a* may generate a tile list for each tile. A tile list may comprise information about the primitives that overlap a corresponding tile. The information about the primitives may be referred to as vertex information or vertex attributes. In an exemplary embodiment of the invention, a primitive may comprise a triangle. A tile list may comprise information associated with vertices of one or more triangles that overlap the corresponding tile, for example. A tile list may be utilized for rendering pixels located within a tile that corresponds to the tile list. In various exemplary embodiments of the invention, the tile lists may comprise pointers to memory locations and/or indices for a table in memory that may comprise primitive information. The primitive information may comprise vertex attributes, such as color, lighting, depth and/or texture. The information stored within the tile lists may be compressed by the MMP 101*a* and may be stored in the memory 101*t* and/or the external memory 101*n* for example. The tile lists may be utilized to access the primitive information during the tile based pixel rendering.

The processor 101*j* may comprise suitable circuitry, logic, interfaces, and/or code that may be operable to control processes in the mobile multimedia system 105. Although not shown in FIG. 1A, the processor 101*j* may be coupled to a plurality of devices in and/or coupled to the mobile multimedia system 105.

In operation, the mobile multimedia device may receive signals via the antenna 101*d*. Received signals may be processed by the RF block 101*e* and the RF signals may be converted to baseband by the baseband processing block 101*f*. Baseband signals may then be processed by the MMP 101*a*. Audio and/or video data may be received from the external camera 101*m*, and image data may be received via the integrated camera 101*g*. During processing, the MMP 101*a* may utilize the external memory 101*n* for storing of processed data. Processed audio data may be communicated to the audio block 101*s* and processed video data may be communicated to the LCD 101*b* and/or the external LCD 101*p*, for example. The keypad 101*c* may be utilized for communicating processing commands and/or other data, which may be required for audio or video data processing by the MMP 101*a*.

In an embodiment of the invention, the MMP 101*a* may be operable to perform tile based pixel rendering of 2D and/or 3D graphics data. The 2D and/or 3D graphics data may be received from the PC 101*k*, for example. The MMP 101*a* may perform the tile based pixel rendering in two phases, for example, a tile binning phase and a tile rendering phase. The tile binning phase may comprise partial vertex shading and generating the tile lists. The tile rendering phase may comprise utilizing ones of the tile lists to render pixels from the geometric primitives located within corresponding ones of the tiles.

In an exemplary embodiment of the invention, the MMP 101*a* may be operable to process video signals received wirelessly or generated by an imaging sensor, such as the external camera 101*m* or the camera 101*g*, for example. The MMP 101*a* may process video signals within a plurality of video modules, as described further with respect to FIG. 1B.

Figure 1B:
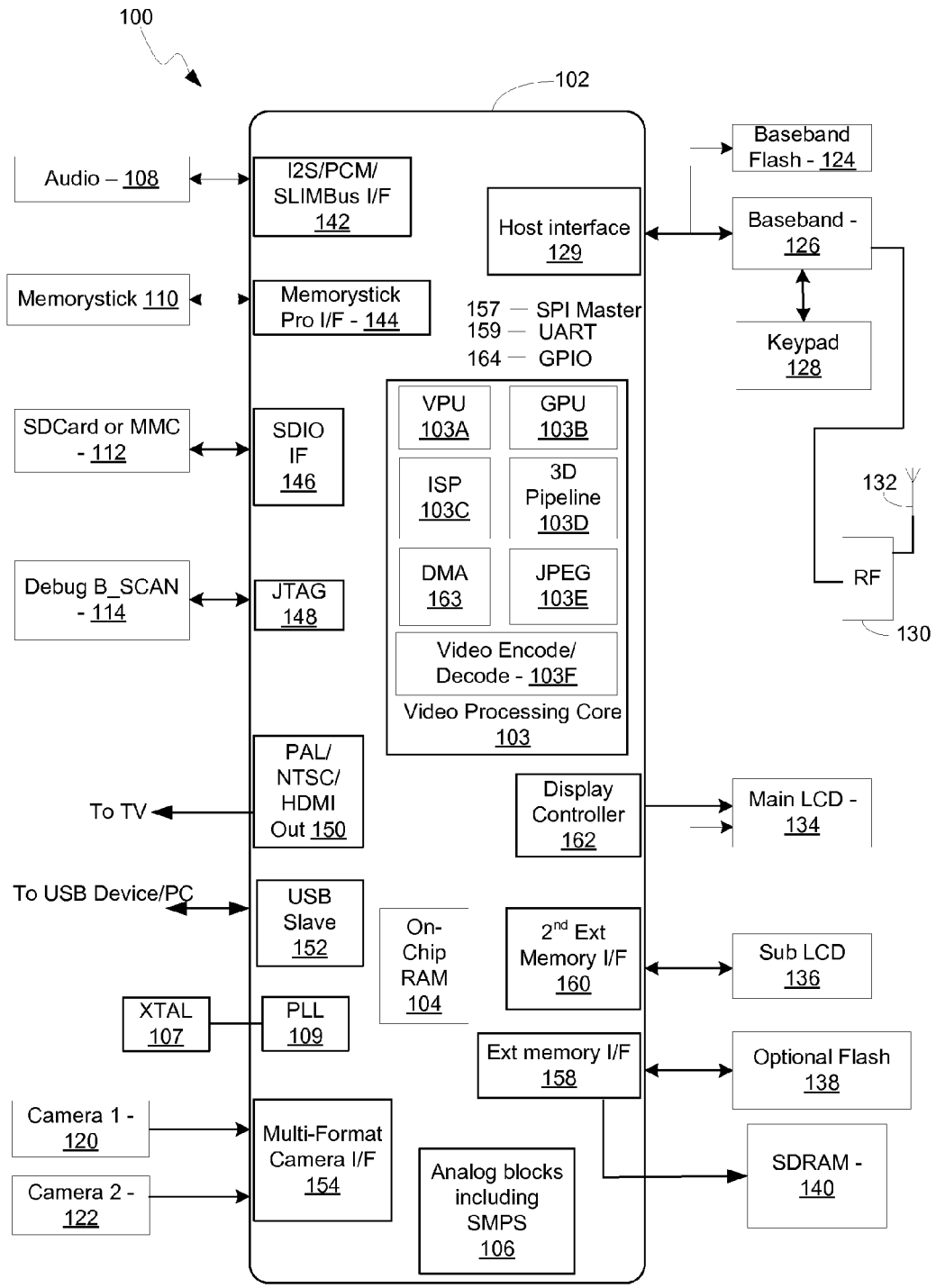
FIG. 1B is a block diagram of an exemplary multimedia processor that is operable to compress tile lists utilized in 3D rendering, in accordance with an embodiment of the invention.

FIG. 1B is a block diagram of an exemplary multimedia processor that is operable to compress tile lists utilized in 3D rendering, in accordance with an embodiment of the invention. Referring to FIG. 1B, the mobile multimedia processor 102 may comprise suitable logic, circuitry, interfaces, and/or code that may be operable to perform video and/or multimedia processing for handheld multimedia products. For example, the mobile multimedia processor 102 may be designed and optimized for video record/playback, mobile TV and 3D mobile gaming, utilizing integrated peripherals and a video processing core. The mobile multimedia processor 102 may comprise a video processing core 103 that may comprise a graphic processing unit 103B, an image sensor pipeline (ISP) 103C, a 3D pipeline 103D, a direct memory access (DMA) controller 163, a joint photographic experts group (JPEG) encoding/decoding module 103E, and a video encoding/decoding module 103F. The mobile multimedia processor 102 may also comprise on-chip RAM 104, an analog block 106, a phase locked loop (PLL) 109, an audio interface (I/F) 142, a memory stick I/F 144, SD card I/F 146, JTAG I/F 148, TV output I/F 150, USB I/F 152, a camera I/F 154, and a host I/F 129. The mobile multimedia processor 102 may further comprise a serial peripheral interface (SPI) 157, a universal asynchronous receiver/transmitter (UART) I/F 159, general purpose input/output (GPIO) pins 164, a display controller 162, an external memory I/F 158, and a second external memory I/F 160.

The video processing core 103 may comprise suitable logic, circuitry, interfaces, and/or code that may be operable to perform video and 2D and/or 3D graphics processing of data. The on-chip RAM 104 and the SDRAM 140 comprise suitable logic, circuitry interfaces and/or code that may be adapted to store data such as image or video data. For example, the on-chip RAM 104 and/or the SDRAM 140 may be operable to store tables of vertex attributes and/or one or more tile lists that may be read into the video processing core 103 and/or the 3D pipeline 103d during tile based pixel rendering.

The image sensor pipeline (ISP) 103C may comprise suitable circuitry, logic, interfaces and/or code that may be operable to process image data. The ISP 103C may perform a plurality of processing techniques comprising filtering, demosaic, lens shading correction, defective pixel correction, white balance, image compensation, Bayer interpolation, color transformation, and post filtering, for example. The processing of image data may be performed on variable sized tiles, reducing the memory requirements of the ISP 103C processes.

The GPU 103B may comprise suitable logic, circuitry, interfaces, and/or code that may be operable to offload graphics rendering from a general processor, such as the processor 101j, described with respect to FIG. 1A. The GPU 103B may be operable to perform mathematical operations specific to graphics processing, such as texture mapping and rendering polygons, for example.

The 3D pipeline 103D may comprise suitable circuitry, logic, interfaces and/or code that may enable the rendering of 2D and 3D graphics. The 3D pipeline 103D may perform a plurality of processing techniques comprising vertex processing, rasterizing, early-Z culling, interpolation, texture lookups, pixel shading, depth test, stencil operations and color blend, for example. In this regard, the 3D pipeline 103D may be operable to perform tile based pixel rendering in two phases, a binning phase and a tile rendering phase. The 3D pipeline 103D may generate a plurality of tile lists during the binning phase. The tile lists may comprise index lists. The indices may point to vertex attributes that may be stored in a table. The contents of the tile lists may be compressed. The tile lists and/or the table of vertex attributes may be stored in the on-chip RAM 104 and/or the SDRAM 140, for example. The 3D pipeline 103D may read the tile lists and/or the vertex attributes and may perform the pixel rendering phase for each tile.

The JPEG module 103E may comprise suitable logic, circuitry, interfaces, and/or code that may be operable to encode and/or decode JPEG images. JPEG processing may enable compressed storage of images without significant reduction in quality.

The video encoding/decoding module 103F may comprise suitable logic, circuitry, interfaces, and/or code that may be operable to encode and/or decode images, such as generating full 108p HD video from H.264 compressed data, for example. In addition, the video encoding/decoding module 103F may be operable to generate standard definition (SD) output signals, such as phase alternating line (PAL) and/or national television system committee (NTSC) formats.

The analog block 106 may comprise a switch mode power supply (SMPS) block and an on-chip SMPS controller, which may be adapted to generate its core voltage. The core voltage may be software programmable according to, for example, speed demands on the mobile multimedia processor 102, allowing further control of power management.

The PLL 109 may comprise suitable logic, circuitry, interfaces, and/or code that may be operable to generate suitable clock signals, 195 kHz-200 MHz clocks, for example, for external devices. A crystal, the XTAL 107, may be coupled to the PLL 109 and may comprise suitable logic, circuitry, interfaces, and/or code that may be operable to generate a stable oscillating signal for the PLL 109. Other voltages and clock speeds may be utilized depending on the type of application. The mobile multimedia processor 102 may comprise a plurality of power modes of operation, for example, run, sleep, hibernate and power down.

The audio block 108 may comprise suitable logic, circuitry, interfaces, and/or code that may be operable to communicate with the mobile multimedia processor 102 via an inter-IC sound ($I^2S$), pulse code modulation (PCM), serial low-power inter-chip media bus (SLIMBus), audio codec (AC'97) interface 142 or other suitable interface, for example. In the case of an AC'97 and/or an $I^2S$ interface, suitable audio controller, processor and/or circuitry may be operable to provide AC'97 and/or $I^2S$ audio output respectively, in either master or slave mode. In the case of the PCM interface, a suitable audio controller, processor and/or circuitry may be operable to allow input and output of telephony or high quality stereo audio. The PCM audio controller, processor and/or circuitry may comprise independent transmit and receive first in first out (FIFO) buffers and may use DMA to further reduce processor overhead. The audio block 108 may also comprise an audio in, audio out port and a speaker/microphone port (not illustrated in FIG. 1B).

The mobile multimedia device 100 may comprise at least one portable memory input/output (I/O) block. In this regard, the memorystick block 110 may comprise suitable logic, circuitry, interfaces, and/or code that may be operable to communicate with the mobile multimedia processor 102 via a memorystick pro interface 144, for example. The SD card block 112 may comprise suitable logic, circuitry, interfaces, and/or code that may be operable to communicate with the mobile multimedia processor 102 via a SD input/output (I/O) interface 146, for example. A multimedia card (MMC) may also be utilized to communicate with the mobile multimedia processor 102 via the SD input/output (I/O) interface 146, for example. The mobile multimedia device 100 may comprise other portable memory I/O blocks such an xD I/O card.

The debug block 114 may comprise suitable logic, circuitry, interfaces, and/or code that may be operable to communicate with the mobile multimedia processor 102 via a joint test action group (JTAG) interface 148, for example. The debug block 114 may be adapted to access the address space of the mobile multimedia processor 102 and may be adapted to perform boundary scan via an emulation interface. Other test access ports (TAPs) may be utilized. The phase alternate line (PAL)/national television standards committee (NTSC)/high definition multimedia interface (HDMI) TV output I/F 150 may be utilized for communication with a TV, and the universal serial bus (USB) 1.1, or other variant thereof, slave port I/F 152 may be utilized for communications with a PC, for example. The cameras 120 and/or 122 may comprise suitable logic, circuitry, interfaces, and/or code that may be operable to generate images and/or HD video and communicate with the mobile multimedia processor 102 via a multi-format raw/CCIR 601 camera interface 154, for example. The camera I/F 154 may also be used, for example, to connect the mobile multimedia processor 102 to a mobile TV front end.

The mobile multimedia processor 102 may also comprise a plurality of serial interfaces, such as the USB I/F 152, a serial peripheral interface (SPI) 157, and a universal asynchronous receiver/transmitter (UART) I/F 159 for Bluetooth or IrDA. The SPI master interface 157 may comprise suitable circuitry, logic, interfaces and/or code and may be utilized to control image sensors. Two chip selects may be provided, for example, and the interface may work in a polled mode with interrupts or via a DMA controller 163. In another embodiment of the invention, the interface may comprise an I2C serial interface, which may be used for camera control, for example. Furthermore, the mobile multimedia processor 102 may comprise a plurality of general purpose I/O (GPIO) pins 164, which may be utilized for user defined I/O or to connect to the internal peripherals. The display controller 162 may comprise suitable circuitry, logic, interfaces and/or code and may be adapted to support multiple displays with VGA, XGA, or HD resolution, for example, and to handle 8/9/16/18/24-bit video data.

The mobile multimedia processor 102 may be connected via an 8/16 bit parallel host interface 129 to the same bus as the baseband processing block 126 uses to access the baseband flash memory 124. The host interface 129 may be operable to provide two channels with independent address and data registers through which a host processor may read and/or write directly to the memory space of the mobile multimedia processor 102. The baseband processing block 126 may comprise suitable logic, circuitry, interfaces, and/or code that may be operable to convert RF signals to baseband and communicate the baseband processed signals to the mobile multimedia processor 102 via the host interface 129, for example. The RF processing block 130 may comprise suitable logic, circuitry, interfaces, and/or code that may be operable to receive signals via the antenna 132 and to communicate RF or IF signals to the baseband processing block 126. The host interface 129 may comprise a dual software channel with a power efficient bypass mode.

The main LCD 134 may be adapted to receive data from the mobile multimedia processor 102 via a display controller 162 and/or from a second external memory interface 160, for example. The display controller 162 may comprise suitable logic, circuitry, interfaces and/or code and may be adapted to drive an internal TV out function or be connected to a range of LCD's. The display controller 162 may be adapted to support a range of screen buffer formats and may utilize direct memory access (DMA) to access the buffer directly and increase video processing efficiency of the video processing core 103. Both NTSC and PAL raster formats may be generated by the display controller 162 for driving the TV out. Other formats, for example SECAM, may also be supported.

The display controller 162 may recognize and communicate a display type to the DMA controller 163. In this regard, the DMA controller 163 may fetch video data in an interlaced or non-interlaced fashion for communication to an interlaced or non-interlaced display coupled to the mobile multimedia processor 102 via the display controller 162.

The subsidiary LCD 136 may comprise suitable logic, circuitry, interfaces and/or code that may be adapted to communicate with the mobile multimedia processor 102 via a second external memory interface 160, for example. The subsidiary LCD 136 may be used on a clamshell phone where the main LCD 134 may be inside and the subsidiary LCD 136 may be outside, for example. The mobile multimedia processor 102 may comprise a RGB external data bus. The mobile multimedia processor 102 may be adapted to scale image output with pixel level interpolation and a configurable refresh rate.

The optional flash memory 138 may comprise suitable logic, circuitry, interfaces, and/or code that may be operable to communicate with the mobile multimedia processor 102 via an external memory interface 158, for example. The SDRAM 140 may comprise suitable logic, circuitry, interfaces and/or code that may be adapted to receive data from the mobile multimedia processor 102 via the external memory interface 158, for example. The external memory I/F 158 may be utilized by the mobile multimedia processor 102 to connect to the SDRAM 140, SRAM, Flash memory 138, and/or external peripherals, for example. Control and timing information for the SDRAM 140 and other asynchronous devices may be configurable by the mobile multimedia processor 102.

The mobile multimedia processor 102 may further comprise a secondary external memory interface 160 to connect to memory-mapped LCD and external peripherals, for example. The secondary external memory interface 160 may comprise suitable circuitry, logic, interfaces and/or code and may be utilized to connect the mobile multimedia processor 102 to slower devices without compromising the speed of external memory access. The secondary external memory interface 160 may provide 16 data lines, for example, 6 chip select/address lines, and programmable bus timing for setup, access and hold times, for example. The mobile multimedia processor 102 may be adapted to provide support for NAND/NOR Flash including NAND boot and high speed direct memory access (DMA), for example.

In operation, the mobile multimedia processor (MMP) 102 may be adapted to generate 3D graphics images using Open GL and/or OpenVG software, for example. The mobile multimedia processor 102 may be adapted to perform tile mode graphics rendering in two phases comprising a tile binning phase and a tile rendering phase. The tile binning phase may comprise a binning process for determining in which tiles geometric primitives are located. Lists may be generated for each tile which may comprise indices that reference a table of vertex attributes. The indices may be compressed within the tile lists. During the tile rendering phase, the tile lists may be utilized to reference vertex attributes for the primitives located within the tile. The vertex attributes may be brought into local memory on a tile basis. The vertex attributes may be utilized to perform vertex shading and render pixels in a tile. Once the tile is rendered, the rendered pixels may be pushed to main memory, for example, the on-chip RAM 104 and/or the SDRAM 140.

Figure 2:
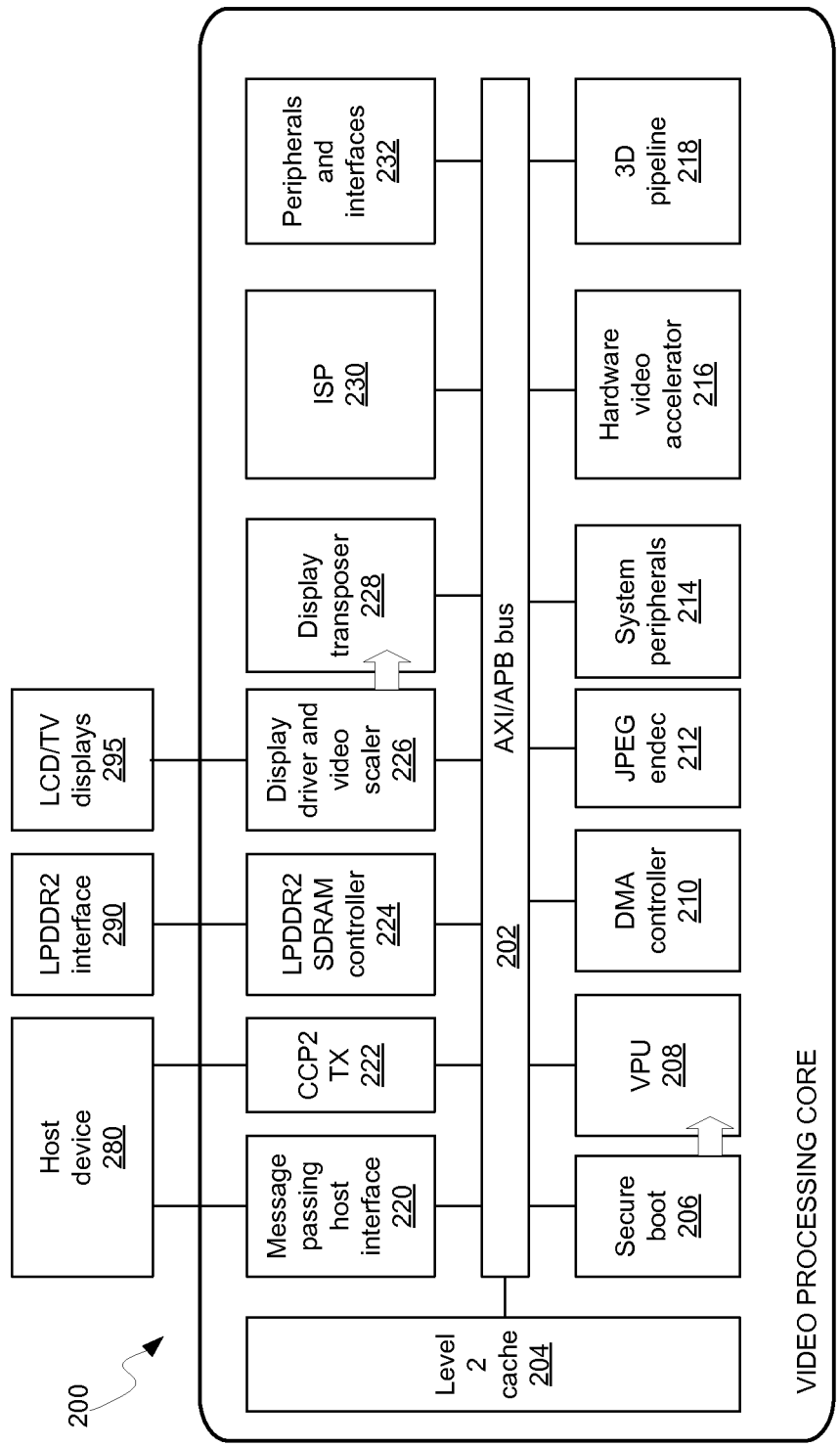
FIG. 2 is a block diagram that illustrates an exemplary video processing core architecture that is configured to compress tile lists utilized in 3D rendering, in accordance with an embodiment of the invention.

FIG. 2 is a block diagram that illustrates an exemplary video processing core architecture that is configured to compress tile lists utilized in 3D rendering, in accordance with an embodiment of the invention. Referring to FIG. 2, there is shown a video processing core 200 comprising suitable logic, circuitry, interfaces and/or code that may be operable to perform high performance video and multimedia processing. The architecture of the video processing core 200 may be configured to provide a flexible, low power, and high performance multimedia solution for a wide range of applications, including mobile applications, for example. By using dedicated hardware pipelines in the architecture of the video processing core 200, such low power consumption and high performance goals may be achieved. The video processing core 200 may correspond to, for example, the video processing core 103 described above with respect to FIG. 1B.

The architecture of the video processing core 200 may be configured based on various applications, features and/or capabilities provide by a host device. For example, the video processing core 200 may be configured to support multiple capabilities, comprising image sensor processing, high rate (e.g., 30 frames-per-second) high definition (e.g., 1080p) video encoding and/or decoding, three-dimensional (3D) graphics, high speed Joint Photographic Experts Group (JPEG) encode and decode, audio codecs, image scaling, and/or liquid crystal display (LCD) and television (TV) outputs, for example.

In one exemplary embodiment of the invention, the video processing core 200 may comprise an Advanced eXtensible Interface/Advanced Peripheral (AXI/APB) bus 202, a level 2 cache 204, a secure boot 206, a Vector Processing Unit (VPU) 208, a direct memory access (DMA) controller 210, a JPEG encoder/decoder (endec) 212, a systems peripherals 214, a message passing host interface 220, a Compact Camera Port 2 (CCP2) transmitter (TX) 222, a Low-Power Double-Data-Rate 2 Synchronous Dynamic Random Access Memory (LP-DDR2 SDRAM) controller 224, a display driver and video scaler 226, and a display transposer 228. The video processing core 200 may also comprise an image sensor pipeline (ISP) 230, a hardware video accelerator 216, a 3D pipeline 218, and peripherals and interfaces 232. In other embodiments of the video processing core 200, however, fewer or more components than those described above may be included.

In one embodiment of the invention, the VPU 208, the ISP 230, the 3D pipeline 218, the JPEG endec 212, the DMA controller 210, and/or the hardware video accelerator 216, may correspond to the VPU 103A, the ISP 103C, the 3D pipeline 103D, the JPEG 103E, the DMA 163, and/or the video encode/decode 103F described above with respect to FIG. 1B.

Coupled to the video processing core 200 may be a host device 280, an LPDDR2 interface 290, and/or LCD/TV displays 295. The host device 280 may comprise a processor, such as a microprocessor or Central Processing Unit (CPU), microcontroller, Digital Signal Processor (DSP), or other like processor, for example. In some embodiments of the invention, the host device 280 may correspond to the processor 101j described above with respect to FIG. 1A. The LPDDR2 interface 290 may comprise suitable logic, circuitry, interfaces and/or code that may be operable to allow communication between the LPDDR2 SDRAM controller 224 and memory. The LCD/TV displays 295 may comprise one or more displays (e.g., panels, monitors, screens, cathode-ray tubes (CRTs)) for displaying image and/or video information. In some embodiments of the invention, the LCD/TV displays 295 may correspond to one or more of the TV 101h and the external LCD 101p described above with respect to FIG. 1A, and the main LCD 134 and the sub LCD 136 described above with respect to FIG. 1B.

The message passing host interface 220 and the CCP2 TX 222 may comprise suitable logic, circuitry, interfaces and/or code that may be operable to allow data and/or instructions to be communicated between the host device 280 and one or more components in the video processing core 200. The data communicated may comprise image and/or video data, for example. In this regard, the CCP2 TX 222 may be operable to communicate high speed differential signaling comprising data generated by the image sensor processor (ISP) 230 to the host device 280.

The LPDDR2 SDRAM controller 224 and the DMA controller 210 may comprise suitable logic, circuitry, interfaces and/or code that may be operable to control access to memory by one or more components and/or processing blocks in the video processing core 200.

The VPU 208 may comprise suitable logic, circuitry, interfaces and/or code that may be operable for data processing while maintaining high throughput and low power consumption. The VPU 208 may provide flexibility in the video processing core 200 such that software routines, for example, may be inserted into the processing pipeline. The VPU 208 may comprise dual scalar cores and a vector core, for example. The dual scalar cores may use a Reduced Instruction Set Computer (RISC)-style scalar instruction set and the vector core may use a vector instruction set, for example. Scalar and vector instructions may be executed in parallel.

Although not shown in FIG. 2, the VPU 208 may comprise one or more Arithmetic Logic Units (ALUs), a scalar data bus, a scalar register file, one or more Pixel-Processing Units (PPUs) for vector operations, a vector data bus, a vector register file, a Scalar Result Unit (SRU) that may operate on one or more PPU outputs to generate a value that may be provided to a scalar core. Moreover, the VPU 208 may comprise its own independent level 1 instruction and data cache.

The ISP 230 may comprise suitable logic, circuitry, interfaces and/or code that may be operable to provide hardware accelerated processing of data received from an image sensor (e.g., charge-coupled device (CCD) sensor, complimentary metal-oxide semiconductor (CMOS) sensor). The ISP 230 may comprise multiple sensor processing stages in hardware, including demosaicing, geometric distortion correction, color conversion, denoising, and/or sharpening, for example. The ISP 230 may comprise a programmable pipeline structure. The flexibility of the ISP 230 enables information to be taken from anywhere in the hardware pipeline and processed using software. The resulting software processed data may then be inserted at any location into the ISP 230 for processing.

The hardware video accelerator 216 may comprise suitable logic, circuitry, interfaces and/or code that may enable hardware accelerated processing of video data in any one of a plurality of video formats such as H.264, Windows Media 8/9/10 (VC-1), MPEG-1, MPEG-2, and MPEG-4, for example. For H.264, for example, the hardware video accelerator 216 may encode at full high-definition (HD) 1080p at 30 fps. For MPEG-4, for example, the hardware video acceleration 216 may encode a HD 720p at 30 fps. For H.264, VC-1, MPEG-1, MPEG-2, and MPEG-4, for example, the hardware video accelerator 216 may decode at full HD 1080p at 30 fps or better. The hardware video accelerator 216 may be operable to provide concurrent encoding and decoding for video conferencing and/or to provide concurrent decoding of two video streams for picture-in-picture applications, for example.

The 3D pipeline 218 may comprise suitable logic, circuitry, interfaces and/or code that may be operable to provide 3D rendering operations for use in, for example, graphics applications. The 3D pipeline 218 may support OpenGL-ES 2.0, OpenGL-ES 1.1, and OpenVG 1.1, for example. The 3D pipeline 218 may comprise a multi-core programmable pixel shader, for example. The 3D pipeline 218 may be operable to handle 32M triangles-per-second (16M rendered triangles-per-second), for example. The 3D pipeline 218 may be operable to handle 1G rendered pixels-per-second with Gouraud shading and one bi-linear filtered texture, for example. The 3D pipeline 218 may support four times (4×) full-screen anti-aliasing at full pixel rate, for example.

The JPEG endec 212 may comprise suitable logic, circuitry, interfaces and/or code that may be operable to provide processing (e.g., encoding, decoding) of images. The encoding and decoding operations need not operate at the same rate. For example, the encoding may operate at 120M pixels-per-second and the decoding may operate at 50M pixels-per-second depending on the image compression.

The display driver and video scaler 226 may comprise suitable logic, circuitry, interfaces and/or code that may be operable to drive the TV and/or LCD displays in the TV/LCD displays 295. Although an LCD display is shown in FIG. 2, the invention is not so limited and may comprise any suitable display type. For example, an LED display and/or a plasma display may be utilized. The display driver and video scaler 226 may output to the TV and LCD displays concurrently and in real time, for example. Moreover, the display driver and video scaler 226 may comprise suitable logic, circuitry, interfaces and/or code that may be operable to scale, transform, and/or compose multiple images. The display driver and video scaler 226 may support displays of up to full HD 1080p at 60 fps.

The display transposer 228 may comprise suitable logic, circuitry, interfaces and/or code that may be operable for transposing output frames from the display driver and video scaler 226. The display transposer 228 may be operable to convert video to 3D texture format and/or to write back to memory to allow processed images to be stored and saved.

The secure boot 206 may comprise suitable logic, circuitry, interfaces and/or code that may be operable to provide security and Digital Rights Management (DRM) support. The secure boot 206 may comprise a boot Read Only Memory (ROM)) that may be used to provide secure root of trust. The secure boot 206 may comprise a secure random or pseudo-random number generator and/or secure (One-Time Password) OTP key or other secure key storage.

The AXI/APB bus 202 may comprise suitable logic, circuitry, interfaces and/or interface that may be operable to provide data and/or signal transfer between various components of the video processing core 200. In the example shown in FIG. 2, the AXI/APB bus 202 may be operable to provide communication between one or more of the components of the video processing core 200.

The AXI/APB bus 202 may comprise one or more buses. For example, the AXI/APB bus 202 may comprise one or more AXI-based buses and/or one or more APB-based buses. The AXI-based buses may be operable for cached and/or uncached transfer, and/or for fast peripheral transfer. The APB-based buses may be operable for slow peripheral transfer, for example. The transfer associated with the AXI/APB bus 202 may be of data and/or instructions, for example. The AXI/APB bus 202 may provide a high performance system interconnect that allows the VPU 208 and other components of the video processing core 200 to communicate efficiently with each other and with external memory.

The level 2 cache 204 may comprise suitable logic, circuitry, interfaces and/or code that may be operable to provide caching operations in the video processing core 200. The level 2 cache 204 may be operable to support caching operations for one or more of the components of the video processing core 200. The level 2 cache 204 may complement level 1 cache and/or local memories in any one of the components of the video processing core 200. For example, when the VPU 208 comprises its own level 1 cache, the level 2 cache 204 may be used as complement. The level 2 cache 204 may comprise one or more blocks of memory. In one embodiment, the level 2 cache 204 may be a 128 kilobyte four-way set associate cache comprising four blocks of memory (e.g., Static Random Access Memory (SRAM)) of 32 kilobytes each.

The system peripherals 214 may comprise suitable logic, circuitry, interfaces and/or code that may be operable to support applications such as, for example, audio, image, and/or video applications. In one embodiment of the invention, the system peripherals 214 may be operable to generate a random or pseudo-random number, for example. The capabilities and/or operations provided by the peripherals and interfaces 232 may be device or application specific.

In operation, the video processing core 200 may be operable to carry out multiple multimedia tasks simultaneously without degrading individual function performance. In various exemplary embodiments of the invention, the 3D pipeline 218 may be operable to compress tile lists that may be utilized for 3D rendering. For example, the video processing core 200 may be operable to implement movie playback operations. In this regard, the video processing core 200 may be operable to add 3D effects to video output, for example, to map the video onto 3D surfaces or to mix 3D animation with the video. The 3D graphics may be rendered by the 3D pipeline 218 on a tile basis utilizing the compressed tile lists.

In another exemplary embodiment of the invention, the video processing core may be utilized in a gaming device. In this regard, full 3D functionality may be utilized. The VPU 208 may execute a game engine and may supply polygons to the 3D pipeline, for example, enabling high quality self-hosted games. The polygons may be rendered utilizing compressed tile lists. The compressed tile lists may be generated during a binning phase and may be utilized during a tile rendering phase.

In another embodiment of the invention, the video processing core 200 may be utilized for stills capture. In this regard, the ISP 230 and/or the JPEG endec 212 may be utilized to capture and encode a still image. For stills viewing and/or editing, the JPEG endec 212 may be utilized to decode the stills data and the video scaler may be utilized for display formatting. Moreover, the 3D pipeline may utilize compressed tile lists to render 3D effects, for example, for warping an image or for page turning transitions in a slide show, for example.

Figure 3:
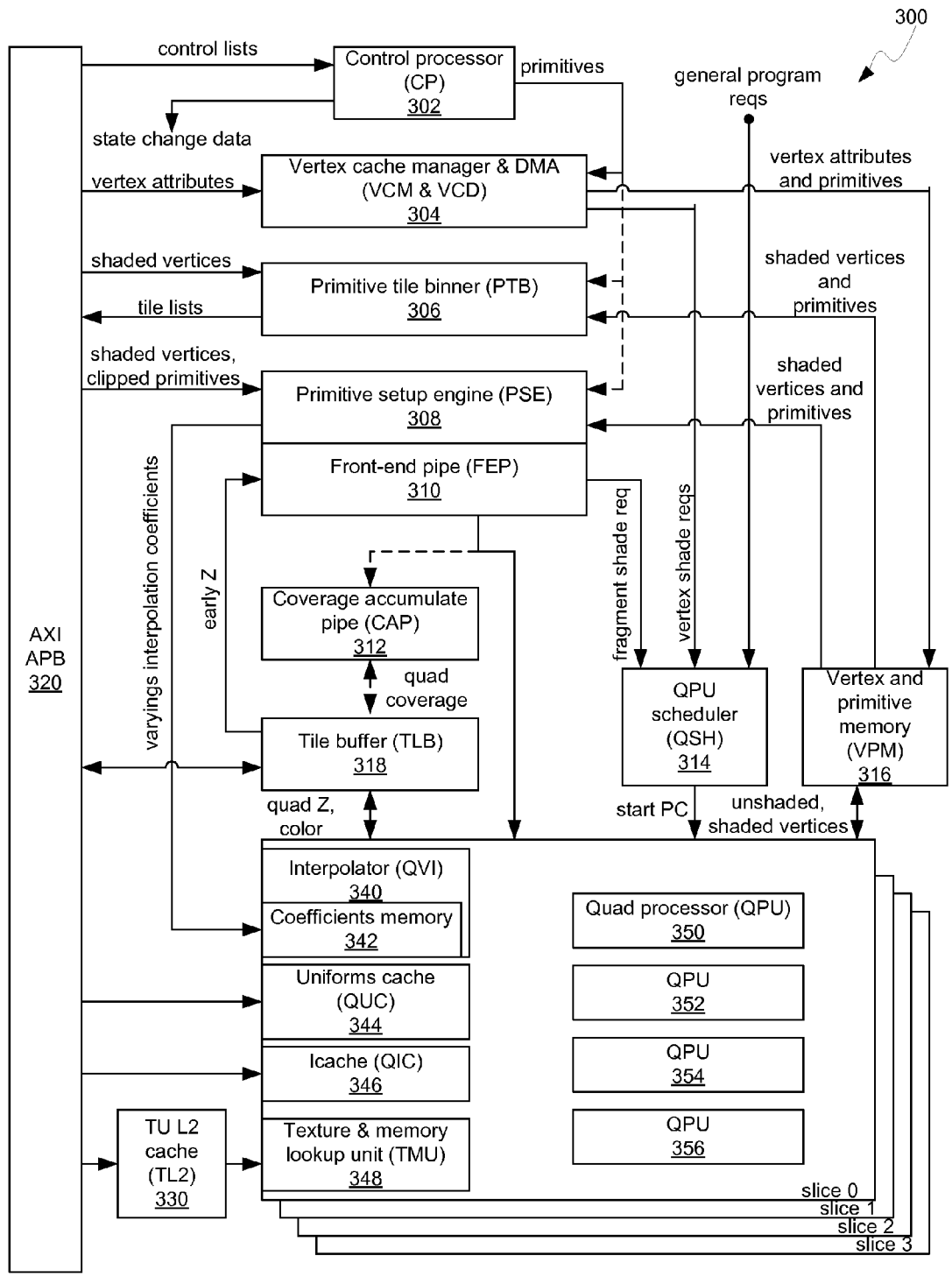
FIG. 3 is a block diagram that illustrates an exemplary 3D pipeline that is operable to compress tile lists utilized in 3D rendering, in accordance with an embodiment of the invention.

FIG. 3 is a block diagram that illustrates an exemplary 3D pipeline that is operable to compress tile lists utilized in 3D rendering, in accordance with an embodiment of the invention. Referring to FIG. 3, there is shown, a 3D pipeline 300 that may comprise a control processor 302, a vertex cache manager and DMA 304, a primitive tile binner 306, a primitive setup engine 308, a front-end pipe 310, a coverage accumulate pipe 312, a QPU scheduler 314, a vertex and primitive memory 316, a tile buffer 318, an AXI/APB bus 320, a cache 330, an interpolator 340, a coefficients memory 342, a uniforms cache 344, an instruction cache 346, a texture and memory lookup unit 348 and a plurality of quad processor units 350, 352, 354 and 356.

The 3D pipeline 300 may be similar and/or substantially the same as the 3D pipeline 218 described with respect to FIG. 2 and/or may be implemented within the mobile multimedia system 105, for example. The 3D pipeline may comprise a scalable architecture and may comprise a plurality of floating-point shading processors, for example, the quad processor units (QPU) 350, 352, 354 and 356. In various embodiments of the invention, the 3D pipeline 300 may be operable to support OpenGL-ES and/or OpenVG applications. Moreover, the 3D pipeline 300 may be utilized in a wide variety of SoC devices, for example, a gaming device. The 3D pipeline 300 may comprise suitable logic, circuitry, interfaces and/or code that may be operable to perform tile-based graphics rendering. Tile based graphics rendering may enable improvements in memory bandwidth and processing performance. In this regard, during graphics processing and/or storage, a frame may be divided into a plurality of areas referred to as tiles. The 3D pipeline 300 may be operable to build lists for each tile that may comprise information regarding graphics primitives within each tile. The graphics primitives may be referred to as primitives. The information regarding primitives may comprise tile lists of compressed indices that may point directly and/or indirectly to vertex data and/or may comprise compressed spatial coordinates, for example, x,y coordinates. Although the 3D pipeline 300 may be utilized to build the tile lists of compressed primitives information, the invention is not limited in this regard and any suitable video processing system may be utilized to build the tile lists of compressed primitives information.

The quad processors (QPU) 350, 352, 354 and 356 may comprise suitable logic, circuitry, interfaces and/or code that may be operable to perform tile based vertex and fragment shading. The QPUs 350, 352, 354 and/or 356 may comprise multiple instances of a special purpose floating-point shader processor. In various embodiments of the invention, each of QPUs 350, 352, 354 and/or 356 may comprise a 16-way single instruction multiple data (SIMD) processor that may be operable to process streams of quads of pixels, however, the invention is not limited in this regard. The QPUs may be organized into groups of 4, for example, that may be referred to as slices. The QPUs 350, 352, 354 and/or 356 may share various common resources. For example, the slices may share the instruction cache (QIC) 346, one or two texture and memory lookup units (TMU) 348, the uniforms cache 344, the coefficients memory 342 and/or the interpolator (QVI) 340. The QPUs 350, 352, 354 and 356 may be closely coupled to 3D hardware for fragment or pixel shading and may utilize signaling instructions and dedicated internal registers. The QPUs 350, 352, 354 and 356 may perform fragment shading, in parallel, on successive batches of pixels. The QPUs may also perform vertex shading, in parallel, on successive batches of vertices.

The QPUs 350, 352, 354 and 356 may also support a plurality of hardware threads with cooperative thread switching that may hide texture lookup latency during 3D fragment shading.

The QPUs 350, 352, 354 and/or 356 may be operable to perform various aspects of interpolating vertices in modified primitives, for example, in clipped primitives. The interpolated vertices may be referred to as varyings. In this regard, blend functions and/or various aspects of interpolating varyings may be performed in software.

The vertex cache manager and vertex direct memory access (VCM and VCD) 304 may comprise suitable logic, circuitry, interfaces and/or code that may be operable to collect batches of vertex attributes and may place them into the vertex and primitive memory (VPM) 316. Each batch of vertices may be shaded by one of the QPUs 350, 352, 354 and/or 356 and the results may be stored back into the VPM 316.

The primitive setup engine (PSE) 308 may comprise suitable logic, circuitry, interfaces and/or code that may be operable to fetch shaded vertex data from the VPM 316. Moreover, the PSE 308 may be operable to calculate setup data for rasterizing primitives and coefficients of various equations for interpolating the varyings. In this regard, rasterization setup parameters and Z and W interpolation coefficients may be fed to the front end pipeline (FEP) 310. The varyings interpolation coefficients may be stored directly to a memory within ones of the QPUs 350, 352, 354 and/or 356 slices for just-in-time interpolation.

The front end pipeline (FEP) 310 may comprise suitable logic, circuitry, interfaces and/or code that may be operable to perform rasterization, Z interpolation, Early-Z test, W interpolation and W reciprocal functions. Groups of pixels output by the FEP 310 may be stored into registers mapped into QPUs which are scheduled to carry out fragment shading for that group of pixels.

There is nominally one Texture and Memory lookup Unit (TMU) per slice, but texturing performance can be scaled by adding TMUs. Since multiple slices are utilized, the same texture will appear in a plurality of TMUs. To avoid memory bandwidth and cache memory wastage with common textures, there is a L2 texture cache (TL2), and each TMU has only a small internal cache.

The AXI/APB bus 320 may be similar and/or substantially the same as the AXI/APB bus 229 described with respect to FIG. 2.

Each of the QPUs 350, 352, 354 and/or 356 may comprise one or more of the texture and memory look up units (TMU) 348 and may share the TL2 cache 330. The TMUs 348 may comprise suitable logic, circuitry, interfaces and/or code that may be operable to perform general purpose data lookups from memory and/or for filtered texture lookups. Alternatively, the VCD 304 may be operable perform direct memory access of data going into or out of the VPM 316 where it may be accessed by the QPUs 350, 352, 354 and/or 356.

The coverage accumulation pipeline (CAP) 312 may comprise suitable logic, circuitry, interfaces and/or code that may be operable to perform OpenVG coverage rendering, for example. In this regard, the QPUs 350, 352, 354 and/or 356 may be bypassed.

The QPUs 350, 352, 354 and/or 356 and/or the CAP 312 may output pixel data to the tile buffer (TLB) 318. In various embodiments of the invention, the TLB 318 may be configured to handle 64×64 samples and/or may support 32×32 pixel tiles. In other embodiments of the invention, TLB 318 may handle 64×64 pixel tiles in non-multi-sample and/or OpenVG 16x coverage modes. The TLB may also be configured to handle 64×32 samples with 64-bit floating-point color for HDR rendering. The TLB 318 may be operable to write decimated color data to a main memory frame buffer when rendering of a tile is complete. The TLB 318 may store and/or reload the tile data to and/or from memory using data compression.

In operation, the 3D pipeline 300 may be driven by control lists in memory, which may specify sequences of primitives and system state data. The control processor (CP) 302 may be operable to interpret the control lists and may feed the 3D pipeline 300 with primitive and state data. In various embodiments of the invention, a pixel rendering pass of all tiles may be performed without use of a driver.

The 3D pipeline 300 may perform tile-based pixel rendering in a plurality of phases, for example, a tile binning phase and a tile rendering phase. During the tile binning phase, only a vertex coordinate transform part of the vertex shading may be performed. The primitive tile binner (PTB) 306 may fetch transformed vertex coordinates and/or primitives from the VPM 316 and may determine which tiles, if any, a primitive may overlap. In this regard, the PTB 306 may build a list in memory for each tile. The tile list may comprise information regarding primitives which overlap the tile and/or references to any state changes that may apply. For example, a tile list may comprise indices that may point to stored vertex shading information for vertices of the primitives overlapping the tile. In various embodiments of the invention, the tile list comprising the indices may be compressed.

The 3D pipeline 300 may be operable to clip primitives, for example, triangles that may extend beyond a tile or beyond a viewport. Clipped primitives may be divided into a plurality of new triangles and vertices for the new triangles, which may be referred to as varyings, may be interpolated. In this regard, the PSE 308 may store varying interpolation coefficients QPU memory, for example, into each QPU 350, 352, 354 and/or 356 memory simultaneously. In various embodiments of the invention, dedicated hardware may be utilized to partially interpolate the varyings and the remaining part of the interpolation may be performed utilizing software that is executed by one or more of the QPUs 350, 352, 354 and/or 356.

During the tile rendering phase, the 3D pipeline 300 may utilize tile lists created during the binning phase to perform tile based rendering of primitives. The 3D pipeline 300 may output rendered pixel information.

Figure 4A:
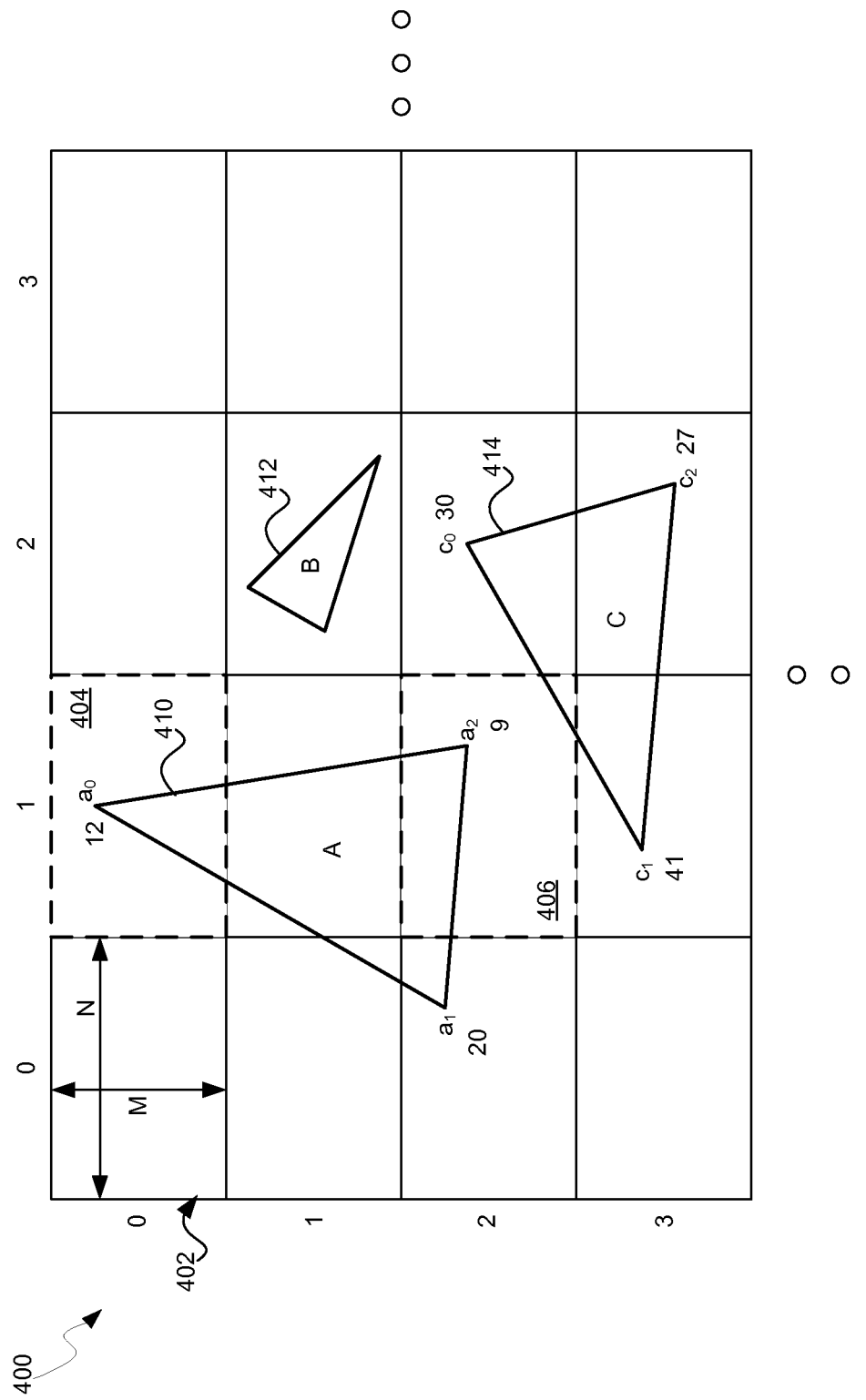
FIG. 4A is a block diagram that illustrates exemplary graphics primitives transformed into a tiled view-space, in accordance with an embodiment of the invention.

FIG. 4A is a block diagram that illustrates exemplary graphics primitives transformed into a tiled view-space, in accordance with an embodiment of the invention. Referring to FIG. 4, there is shown, a tiled view-space frame 400, a plurality of tiles 402, a tile 404, a tile 406 and a plurality of triangles comprising a triangle a 410, a triangle B 412, and a triangle C 414. The triangle A 410, the triangle B 412, and/or the triangle C 414 may be referred to as the triangles 410, 412 and/or 414.

The tiled view-space frame 400 may be divided into a plurality of tiles 402. The tiles may be identified according to their position, for example, the tile 404 may be identified as tile (1, 0) and the tile 406 may be identified as the tile (1, 2). In an exemplary embodiment of the invention, each of the plurality of tiles 402 may comprise a 32×32 block of pixel information, although the invention is not limited in this regard. Graphics primitives may be positioned within the tiled view-space frame 400, for example, the triangles 410, 412 and/or 414 may be placed within the tiled view-space frame 400. Other types of primitives may be utilized, for example, lines, points and/or RHTs. The graphics primitives, for example, the triangles 410, 412 and/or 414 may overlap one or more of the tiles 402. The graphics primitives may be represented in the tiled view-space 400 according to view-space coordinates of their vertices. The graphics primitives and/or their vertices may define one or more of an image, an object and/or a surface, for example. In this regard, the view-space coordinates may indicate a rendered object's position on a video screen.

In operation, graphics primitives, for example, the triangles 410, 412 and/or 414, may be positioned in the tiled view-space frame 400 during the tile binning phase and/or during the tile rendering phase of pixel rendering. Prior to representation in the tiled view-space frame 400, the graphics primitives, for example, the triangles 410, 412 and/or 414, may be generated and/or represented in a model space by graphics software. For example, code compliant with OpenGL and/or variations and/or extensions thereof such as OpenGL-ES may be utilized to generate the graphics primitives in the modeling space. A table of vertices generated by the OpenGL software may comprise a listing of the vertex information and/or vertex attributes of the primitives. The OpenGL table comprising a listing of vertices may be stored in main memory, for example, the on-chip RAM 104 and/or the SDRAM 140. In addition, a list of uncompressed indices that reference the vertices stored within the OpenGL generated table of vertices, may also be stored in the main memory, for example, the on-chip RAM 104 and/or the SDRAM 140 described with respect to FIG. 2. In an exemplary embodiment of the invention, one uncompressed index that may reference one vertex may comprise 32 bits. The model space primitives may be arbitrarily positioned within the modeling space. The 3D pipeline 300 may read vertex information for the graphics primitives represented in modeling space and may apply various transforms that may place the primitives, for example, the triangles 410, 412 and/or 414 at certain coordinates within the tiled view-space frame 400. In this regard, a transformation may place the primitives at the certain coordinates within the tiled view-space frame 400 and another transformation may rotate the primitives according to a field of view. Coordinates for vertices of the graphics primitives in view-space may be determined by the 3D pipeline 300. For example, one or more of the QPUs 350, 352, 354 and/or 356 may be operable to determine the coordinates for the triangles 410, 412 and/or 414 within the tiled view-space frame 400. The transformations may be implemented by matrix multiplication of modeling space coordinates and position and view information received from the OpenGL graphics software, for example.

FIG. 4B is a block diagram that illustrates exemplary vertex information that may be utilized during a tile binning phase and/or during a tile rendering phase, in accordance with an embodiment of the invention. Referring to FIG. 4B, there is shown, a table of vertices 450 and a plurality of indexed vertex records 452, 454, 456, 458, 460 and 462.

The table of vertices 450 may comprise a listing of vertex information for the triangles 410, 412 and/or 414. The indexed vertex records 452, 454, 456, 458, 460 and 462 may comprise information utilized for tile mode binning and/or for tile mode rendering of the triangles 410, 412 and/or 414. The vertex information may also be utilized for interpolating vertices, for example, vertices interpolated for a clipped primitive as described with respect to FIG. 5A, FIG. 5B and FIG. 5C.

In an exemplary embodiment of the invention, the indexed vertex records 452, 454 and 456 may be associated with the indices 9, 12 and 20 and may each comprise information regarding a vertex of the triangle A 410. The indices 9, 12 and 20 may be encoded and/or compressed in each tile list that comprises the triangle A 410 during the tile binning phase and may be utilized to retrieve vertex information during the tile rendering phase. The vertex information may be referred to as vertex attributes. Information stored within each of the indexed vertex records 452, 454, 456, 458, 460 and 462 may comprise modeling space coordinates for a vertex and/or information that may enable transformation of the vertex to a location and/or a field of view within a view-space, for example, within the tiled view-space frame 400. Moreover, information or attributes stored within the indexed vertex records 452, 454, 456, 458, 460 and 462 may comprise lighting, texture, color and/or other information that may be utilized for full vertex shading.

The table of vertices 450 may be stored in main memory, for example, the on-chip RAM 104 and/or the SDRAM 140 and the indexed vertex information needed for rendering of a particular tile may be read into local memory based on information in the compressed tile list, during rendering of the tile. Once pixels for a tile are rendered, the pixel data may be stored in main memory, for example, the on-chip RAM 104 and/or the SDRAM 140.

In operation, rendering of the triangles 410, 412 and/or 414 may comprise a tile binning phase and a tile rendering phase. The triangles 410, 412 and/or 414 may be rendered based on information describing their vertices and/or any interpolated vertices. In this regard, steps performed during the tile binning phase may comprise a subset of the steps performed during the rendering phase. For example, during the tile binning phase, primitives may be transformed into view-space and corresponding view-space coordinates for vertices of the primitives may be determined. As such, the binning phase may be referred to as a coordinate shading phase. Primitives that overlap a tile may be identified. For example, the tile (1, 0) 404 may be overlapped by the triangle A 410. The tile (2, 1) 406 may be overlapped by the triangle A 410 and the triangle C 414. Vertex information and/or vertex attributes may be stored in indexed records within the table of vertices 450. For each tile 402, a tile list may be generated during the tile binning phase that may comprise compressed indices that may be utilized to index vertices within the table of vertices 450. For example, a tile list for the tile (1, 0) 404 may comprise compressed indices that point directly or indirectly to records for vertices of the triangle A 410. A tile list for the tile (1, 2) 406 may comprise compressed indices that point directly or indirectly to records for the vertices of the triangle C 414.

FIG. 4C is a block diagram that illustrates exemplary index information that may be encoded during a tile binning phase of tile mode graphics rendering, in accordance with an embodiment of the invention. Referring to the FIG. 4C, there is shown a tile lists 430 comprising tile list 432 and tile list 434.

The tile lists 430 may be generated during the tile binning phase of tile mode graphics rendering based on determined vertex coordinates of the triangles 410, 412 and/or 414 in the tiled view-space frame 400. For example, the vertex cache manager and DMA (VCM & VCD) may collect vertex attributes and place them into the vertex and primitive memory (VPM) 316. The primitive tile binner (PTB) 306 may fetch transformed vertex coordinates and/or primitives from the vertex and primitive memory (VPM) 316 and may generate the tile lists 430 that may comprise compressed indices. In this regard, each tile within the plurality of tiles 402 may be associated with a tile list, for example, the tile list 432 and the tile list 434. In an exemplary embodiment of the invention, the tile list 432 may comprise an identity of the tile (1, 0) 404 and/or an identity of the triangle A 410. In addition, the tile list 432 may comprise one or more compressed indices that may point directly or indirectly to one or more records comprising vertex information for the triangle A 410, for example, the indices 12, 20, 9 may be compressed. Similarly, the tile list 434 may comprise an identity of the tile (1, 2) 406 and/or an identity of the triangle A 410 and the triangle C 414. In addition, the tile list 434 may comprise compressed indices that reference one or more records in the table of vertices 450 which comprise vertex information for the triangle A 410 and the triangle C 414, for example, one or more of the compressed indices 12, 20, 9 and the indices 30, 27 and 41.

Figure 5A:
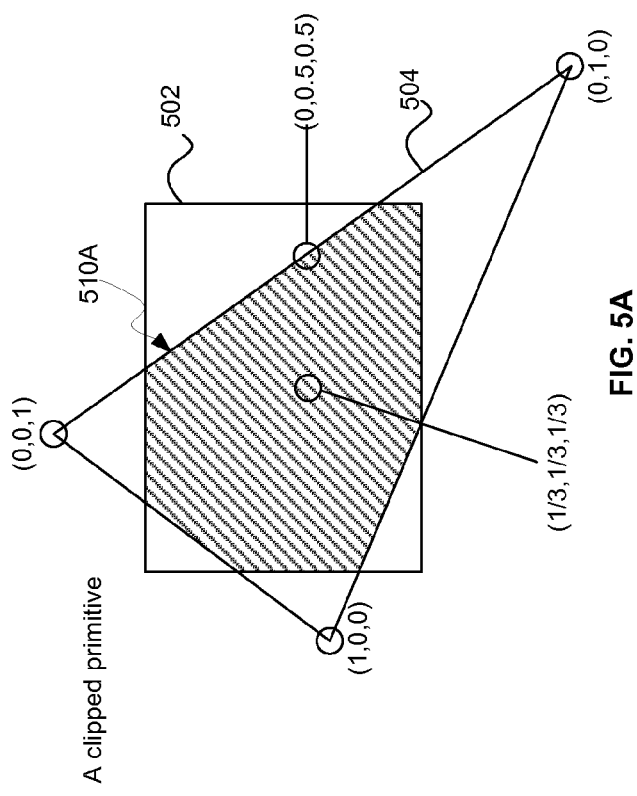
FIG. 5A is a block diagram that illustrates an exemplary primitive that extends beyond the borders of a viewport and/or of a tile, in accordance with an embodiment of the invention.
Figure 5C:
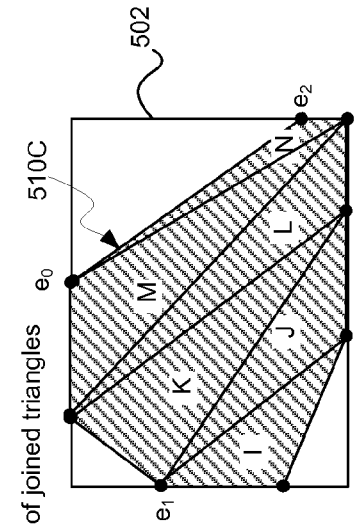
FIG. 5C is a block diagram that illustrates an exemplary clipped primitive that is represented as a strip comprising a plurality of triangles, in accordance with an embodiment of the invention.
Figure 5B:
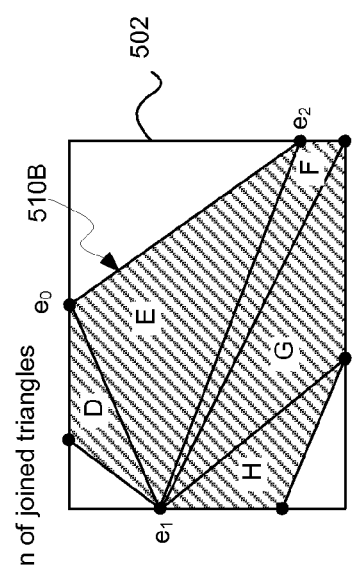
FIG. 5B is a block diagram that illustrates an exemplary clipped primitive that is represented as a plurality of fanned triangles, in accordance with an embodiment of the invention.

In operation, information in the tile lists 430 may be utilized for controlling tile mode graphics rendering by the 3D pipeline 300. For example, vertices may be rendered on a tile basis based on contents of the tile lists. In this regard, during the binning phase, compressed indices corresponding to records of the table of vertices 450 may be stored in the tile lists 430. Also, other information within the tile lists 430 may be compressed. The compressed indices stored in the tile lists 430 may be differentially encoded by indicating a difference in adjacent or nearby index values rather than storing absolute index values. Absolute index values may comprise a large number of bits, for example, 32 bits and differential encoding of the indices may significantly reduce memory bandwidth for storing tile lists as well as improving cache access time. Moreover, in instances when one or more of the vertices are shared by a plurality of joined primitives, for example, two triangles may share two vertices; corresponding shared indices may not be repeated in a tile list. Once an index is listed for one vertex and/or for one primitive, it may not be repeated for a joined primitive that shares the vertex. Indices listed for another joined primitive may only comprise indices for vertices that have not been previously encoded in the tile list. Additional information regarding how the primitives are joined may also be encoded in the tile list. For example, triangles may be joined in a fan or strip pattern. Furthermore, a sequence of fans and/or strips may be joined. In various embodiments of the invention, a compressed sequence of indices may be represented in the tile lists 430 by one number. Exemplary joined primitives are shown in FIG. 5A, FIG. 5B and FIG. 5C which comprise a triangle strip and a triangle fan. In contrast, OpenGL software output may comprise a 32 bit index for each vertex in each joined primitive.

In various embodiments of the invention, the view-space coordinates that are determined during the binning phase may be discarded once the tile lists are generated. The view-space coordinates may be generated again during the rendering phase. In this manner, memory may be conserved.

Compressed tile lists may follow inline within a control list utilized for controlling the 3D pipeline 300, for example. In this regard, the control lists may comprise records of primitive information in the tile lists and/or control information. Each primitive within the tile list may be encoded in a variable number of bytes, for example. The compressed tile lists may be terminated with an escape code, and may also comprise embedded branch records. The embedded branches may allow the list to comprise multiple chained memory blocks. The multiple memory blocks may be processed without escaping from and restarting, processing of the control lists. U.S. patent application Ser. No. 12/942,626, filed on Nov. 9, 2010 and which is incorporated herein in its entirety, provides additional information about processing control lists.

Indices generated by OpenGL software may be represented by 32 bit numbers. Accordingly, three vertices of a triangle may be indexed by OpenGL software with three uncompressed 32 bit numbers. The tables below comprise formats for compressing and/or encoding vertex indices. In this regard, a format is shown for representing three 32 bit indices in one byte. Furthermore, a sequence of indices may be represented with one byte.

The format for a compressed tile list such as the tile list described with respect to FIG. 4C, may be determined based on a primitive list format control record. An exemplary primitive list control record is shown in Table 1. The exemplary primitive list control record comprises an ID equal to 56 which may indicate what subsequent bits may represent.

TABLE 1

| Primitive List Record ID and Data Summary | | | |
|---|---|---|---|
| Synopsis | | | |
| Code | Bits | Offset | Field Description |
| 56 | | | Primitive List Format |
| | 4 | 4 | Data Type<br>1, 2, 3 = 16-bit index, 24-bit index, 32-bit x/y |
| | 4 | 0 | Primitive Type<br>0, 1, 2, 3 = Points, Lines, Triangles, RHT |

Tile lists 430 may comprise various formats, for example, formats for triangles, lines, RHTs and/or points. Indices may be encoded as 16-bit or 24-bit indices, for example. Table 2 comprises exemplary coding formats for compressed triangle indices, Table 3 comprises exemplary coding formats for compressed line and/or RHT indices and Table 4 comprises exemplary coding formats for compressed point indices.

In various embodiments of the invention, formats may enable encoding of (x, y) coordinates, for example, 16+16 bit (x, y) coordinates for triangles and/or RHTs. Table 5 comprises exemplary coding formats for compressed triangle coordinates and Table 6 comprises exemplary coding formats for compressed RHT coordinates.

Although various byte aligned formats for encoding and/or compressing tile lists are described in the tables Table 1 through Table 6, the invention is not limited in this regard. For example, any suitable encoding formats that may perform differential encoding of indices and/or reduction of repeated indices may be utilized. Furthermore, encoded and/or compressed indices and/or (x, y) coordinates may be byte aligned and/or may not be byte aligned.

TABLE 2

Compressed Triangles List Indices
Compressed Triangles List, 16-bit [24-bit] indices

| Bits | Content |
|---|---|
| | Coding 0 (1 byte, 1 relative index) |
| 1:0 | 0 => New tri indices (0, 1) in common with prev tri indices (2, 1)<br>1 => New tri indices (0, 1) in common with prev tri indices (0, 2)<br>2 => New tri indices (0, 1) in common with prev tri indices (1, 0) |
| 7:2 | 2's complement difference between new tri index (2) and prev tri index (2).<br>Range (−31, +31). 32 is reserved for special codes. |
| | Coding 1 (2 bytes, 1 relative index) |
| 1:0 | =3 |
| 3:2 | 0 => New tri indices (0, 1) in common with prev tri indices (2, 1)<br>1 => New tri indices (0, 1) in common with prev tri indices (0, 2)<br>2 => New tri indices (0, 1) in common with prev tri indices (1, 0) |
| 15:4 | 2's complement difference between new tri index (2) and prev tri index (2)<br>(range −2048, +2047) |
| | Coding 2 (4 {5} bytes, 1 absolute, 2 relative indices) |
| 3:0 | =15 |
| 9:4 | 2's complement difference between new tri index (1) and new tri index (0)<br>(range −32, +31) |
| 15:10 | 2's complement difference between new tri index (2) and new tri index (1)<br>(range −32, +31) |
| 31:16<br>{39:16} | Absolute new tri index (0) |
| | Coding 3 (7 {10} bytes, 3 absolute indices) |
| 7:0 | =129 |
| 23:8<br>[31:8] | Absolute new tri index (0) |
| 39:24<br>[55:32] | Absolute new tri index (1) |
| 55:40<br>[79:56] | Absolute new tri index (2) |
| | Relative Branch (3 bytes) |
| 7:0 | =130 |
| 23:8 | 2's complement relative branch (lsb = 32 bytes, |

TABLE 2-continued

Compressed Triangles List Indices
Compressed Triangles List, 16-bit [24-bit] indices

| Bits | Content |
|---|---|
| | range ±1 Mbyte) |
| | Escape Code (1 byte) |
| 7:0 | =128 |

TABLE 3

Compressed Lines or RHTs List Indices
Compressed Lines or RHTs List, 16-bit [24-bit] indices

| Bits | Content |
|---|---|
| | Coding 0 (1 byte, 1 relative index) |
| 1:0 | 0 => New prim index (0) in common with prev prim index (1)<br>1 => New prim index (0) in common with prev prim index (0) |
| 7:2 | 2's complement difference between new prim index (1) and prev prim index (1).<br>Range (−31, +31). 32 is reserved for special codes. |
| | Coding 1 (2 bytes, 1 relative index) |
| 1:0 | =3 |
| 2 | 0 => New prim index (0) in common with prev prim index (1)<br>1 => New prim index (0) in common with prev prim index (0) |
| 15:3 | 2's complement difference between new prim index (1) and prev prim index (1).<br>(range −4096, +4095) |
| | Coding 2 (3 [4] bytes, 1 absolute, 1 relative index) |
| 1:0 | =2 |
| 7:2 | 2's complement difference between new prim index (1) and new prim index (0)<br>Range (−31, +31). 32 is reserved for special codes. |
| 23:8<br>[31:8] | Absolute new prim index (0) |
| | Coding 3 (5 [7] bytes, 2 absolute indices) |
| 7:0 | =129 |
| 23:8<br>[31:8] | Absolute new prim index (0) |
| 39:24<br>[55:32] | Absolute new prim index (1) |
| | Relative Branch (3 bytes) |
| 7:0 | =130 |
| 23:8 | 2's complement relative branch (lsb = 32 bytes, range ±1 Mbyte) |
| | Escape Code (1 byte) |
| 7:0 | =128 |

TABLE 4

Compressed Points List Indices
Compressed Points List, 16-bit [24-bit] indices

| Bits | Content |
|---|---|
| | Coding 0 (1 byte, relative index) |
| 1:0 | =0 or 1 |
| 7:2 | 2's complement difference between new point index and prev point index.<br>Range (−31, +31). 32 is reserved for special codes. |
| | Coding 1 (2 bytes, relative index) |
| 1:0 | =3 |
| 15:2 | 2's complement difference between new point index and prev point index<br>(range −8192, +8191) |

TABLE 4-continued

Compressed Points List Indices
Compressed Points List, 16-bit [24-bit] indices

| Bits | Content |
|---|---|
| | Coding 2 (2 bytes, relative index, run length) |
| 1:0 | =2 |
| 7:2 | 2's complement difference between first point index and prev point index.<br>Range (−31, +31). 32 is reserved for special codes. |
| 15:8 | Number of additional points with consecutive indices |
| | Coding 3 (3 [4] bytes, absolute index) |
| 7:0 | =129 |
| 23:8<br>[31:8] | Absolute new point index |
| | Relative Branch (3 bytes) |
| 7:0 | =130 |
| 23:8 | 2's complement relative branch (lsb = 32 bytes, range ±1 Mbyte) |
| | Escape Code (1 byte) |
| 7:0 | =128 |

TABLE 5

Compressed Triangles List Coordinates
Compressed Triangles List, 16 + 16-bit (x, y) Coordinates

| Bits | Content |
|---|---|
| | Coding 0 (2 bytes, 1 relative coordinate) |
| 1:0 | 0 => New tri indices (0, 1) in common with prev tri indices (2, 1)<br>1 => New tri indices (0, 1) in common with prev tri indices (0, 2)<br>2 => New tri indices (0, 1) in common with prev tri indices (1, 0) |
| 7:2, 8 | 2's complement difference between new tri x (2) and prev tri x (2).<br>Range (−63, +62). 63, 64 are reserved for special codes. |
| 15:9 | 2's complement difference between new tri y (2) and prev tri y (2).<br>Range (−64, +63). |
| | Coding 1 (3 bytes, 1 relative coordinate) |
| 1:0 | =3 |
| 3:2 | 0 => New tri indices (0, 1) in common with prev tri indices (2, 1)<br>1 => New tri indices (0, 1) in common with prev tri indices (0, 2)<br>2 => New tri indices (0, 1) in common with prev tri indices (1, 0) |
| 13:4 | 2's complement difference between new tri x (2) and prev tri x (2).<br>Range (−512, +511). |
| 23:14 | 2's complement difference between new tri y (2) and prev tri y (2).<br>Range (−512, +511). |
| | Coding 2 (8 bytes, 1 absolute, 2 relative coordinates) |
| 3:0 | =15 |
| 10:4 | 2's complement difference between new tri x (1) and new tri x (0).<br>Range (−64, +63). |
| 17:11 | 2's complement difference between new tri y (1) and prev tri y (0).<br>Range (−64, +63). |
| 24:18 | 2's complement difference between new tri x (1) and new tri x (0).<br>Range (−64, +63). |
| 31:25 | 2's complement difference between new tri y (1) and prev tri y (0).<br>Range (−64, +63). |

TABLE 5-continued

Compressed Triangles List Coordinates
Compressed Triangles List, 16 + 16-bit (x, y) Coordinates

| Bits | Content |
|---|---|
| 47:32 | Absolute new tri x (0) |
| 63:48 | Absolute new tri y (0) |
| | Coding 3 (13 bytes, 3 absolute coordinates) |
| 7:0 | =129 |
| 39:8 | Absolute new tri coordinate (y, x) (0) |
| 71:40 | Absolute new tri coordinate (y, x) (1) |
| 103:72 | Absolute new tri coordinate (y, x) (2) |
| | Relative Branch (3 bytes) |
| 7:0 | =130 |
| 23:8 | 2's complement relative branch (lsb = 32 bytes, range ±1 Mbyte) |
| | Escape Code (1 byte) |
| 7:0 | =128 |

TABLE 6

Compressed RHTs List Coordinates
Compressed RHTs List, 16 + 16-bit (x, y) Coordinates

| Bits | Content |
|---|---|
| | Coding 0 (2 bytes, 1 relative coordinate) |
| 1:0 | 0 => New RHT index (0) in common with prev RHT index (1)<br>1 => New RHT index (0) in common with prev RHT index (0) |
| 7:2, 8 | 2's complement difference between new RHT x (1) and prev RHT x (1).<br>Range (−63, +62). 63, 64 are reserved for special codes. |
| 15:9 | 2's complement difference between new RHT y (1) and prev RHT y (1).<br>Range (−64, +63). |
| | Coding 1 (3 bytes, 1 relative coordinate) |
| 1:0 | =3 |
| 2 | 0 => New RHT index (0) in common with prev RHT index (1)<br>1 => New RHT index (0) in common with prev RHT index (0) |
| 13:3 | 2's complement difference between new RHT x (1) and prev RHT x (1).<br>Range (−1024, +1023). |
| 23:14 | 2's complement difference between new RHT y (1) and prev RHT y (1).<br>Range (−512, +511). |
| | Coding 2 (6 bytes, 1 absolute, 1 relative coordinates) |
| 1:0 | =2 |
| 7:2, 8 | 2's complement difference between new RHT x (1) and prev RHT x (1).<br>Range (−63, +62). 63, 64 are reserved for special codes. |
| 15:9 | 2's complement difference between new RHT y (1) and prev RHT y (1).<br>Range (−64, +63). |
| 31:16 | Absolute new RHT x (0) |
| 47:32 | Absolute new RHT y (0) |
| | Coding 3 (9 bytes, 2 absolute coordinates) |
| 7:0 | =129 |
| 39:8 | Absolute new RHT coordinate (y, x) (0) |
| 71:40 | Absolute new RHT coordinate (y, x) (1) |
| | Relative Branch (3 bytes) |
| 7:0 | =130 |
| 23:8 | 2's complement relative branch (lsb = 32 bytes, range ±1 Mbyte) |
| | Escape Code (1 byte) |
| 7:0 | =128 |

FIG. 5A is a block diagram that illustrates an exemplary primitive that extends beyond the borders of a viewport and/ or of a tile, in accordance with an embodiment of the invention. Referring to FIG. 5A, there is shown a view-space frame 502A, a triangle 504 and a clipped triangle 510A.

The view-space frame 502 may be similar to the tiled view-space frame 400.

In operation, during a binning phase of graphics rendering, the coordinates for vertices of a triangle comprising the clipped triangle 510A may be determined. In addition, it may be determined that portions of the triangle 510A may extend beyond the area of the view-space frame 502A. In this instance, the portions of the triangle comprising the clipped triangle 510A that extend beyond the border of the view-space frame 502A may be clipped. New vertices that define the clipped triangle 510A may be determined.

FIG. 5B is a block diagram that illustrates an exemplary clipped primitive that is represented as a plurality of fanned triangles, in accordance with an embodiment of the invention. Referring to FIG. 5B, there is shown the view-space frame 502 and a fan of triangles 510B.

The clipped triangle 510A may be divided into a plurality of new triangles that may be stored in a record. The plurality of new triangles may be arranged in a fan pattern, for example, as in the fan of triangles 510B. In this regard, the plurality of new triangles may be joined. For example, the plurality of new triangles may comprise shared vertices, some or all of which may be new vertices. In this regard, a plurality of triangles radiate from a single vertex in the fan of triangles 510A. Rather than binning the entire triangle 504, the plurality of new triangles may be binned. For example, it may be determined which tiles are overlapped by the plurality of new triangles. Tile lists may be populated with information regarding the new triangles. For example, vertex coordinates for the new triangles may be directly stored within relevant tile lists along with barycentric coordinates for each new vertex. The barycentric coordinates for a new vertex may be utilized to determine shading properties of the new vertex during full vertex shading. For example, the barycentric coordinates of a new vertex may be utilized as weights that indicate its location relative to each of the original vertices of the triangle 504. During full vertex shading, the barycentric coordinates may be utilized to interpolate rendering properties of the new vertex from properties of the original vertices of the triangle 504. The barycentric coordinates may comprise a vector of elements that may sum to one.

In operation, a binning phase of the triangle 504 that may extend to extreme locations and/or extend beyond the boundaries of the view-space frame 502, the triangle 504 may be clipped. The remaining portion of the clipped triangle may be divided into a plurality of new triangles comprising a fan pattern, for example, the fan of triangles 510B. Coordinates the new triangle's vertices may be determined as well as their barycentric coordinates and/or barycentric weights. The coordinates of the new vertices as well as the barycentric coordinates and/or barycentric weights may be stored in the appropriate tile lists. In order to save space, since the barycentric coordinates and/or weights sum to one, only two of the coordinates may be stored. Moreover, shared vertices may be stored only once rather than repeatedly stored for each new triangle.

In various embodiments of the invention, memory may be conserved by storing clipped primitive information in a separate memory location and pointing to it from the tile list. This may conserve significant memory bandwidth in instances when the clipped primitive overlaps a plurality of tiles.

FIG. 5C is a block diagram that illustrates an exemplary clipped primitive that is represented as a strip comprising a plurality of triangles, in accordance with an embodiment of the invention. Referring to FIG. 5C, there is shown the view-space frame 502 and a strip of triangles 510C.

The strip of triangles 510C comprises a plurality of joined triangles in a strip pattern rather than a fan pattern that radiates from a single shared vertex. The strip of triangles may be generated and binned the same or a similar manner as the fan of triangles 510B. Moreover, vertex coordinates and barycentric coordinates may be determined and stored in the same manner and/or in a similar manner for the strip of triangles 510C as for the fan of triangles 510B.

Figure 6:
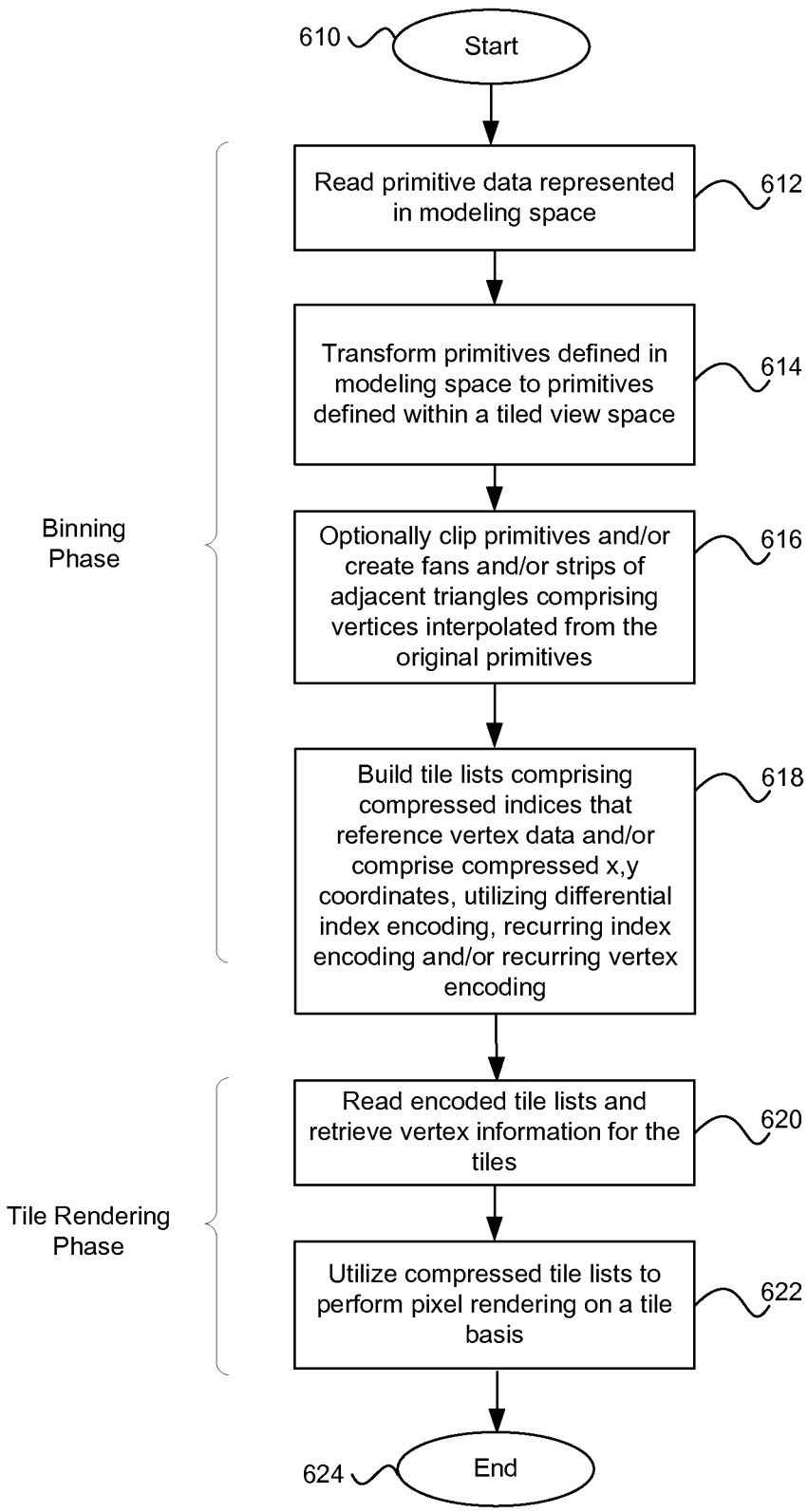
FIG. 6 is a flow chart illustrating exemplary steps for compressing tile lists, in accordance with an embodiment of the invention.

FIG. 6 is a flow chart illustrating exemplary steps for compressing tile lists, in accordance with an embodiment of the invention. The exemplary steps may begin at step 610. In step 612, graphics primitives, for example, the triangle 410 that may be represented in modeling space may be read into the 3D pipeline 300. In step 614, the primitives defined in modeling space may be transformed to primitives defined within a tiled view space, for example, as shown in the tiled view-space frame 400. In step 616, optionally, primitives that may extend beyond a view volume, may be clipped, as shown in FIG. 5A. In this regard, the clipped primitives may be divided into a plurality of triangles. For example, fans and/or strips of adjacent triangles may be generated for which vertices may be interpolated from the original primitives as described with respect to FIG. 5B and FIG. 5C. In step 618, tile lists comprising compressed indices that reference vertex data and/or comprising compressed spatial coordinates, for example, x,y coordinates, may be encoded utilizing differential index encoding, recurring index encoding and/or recurring vertex encoding as described with respect to FIG. 4C and Table 1, Table 2, Table 3, Table 4, Table 5 and Table 6. In step 620, the compressed and/or encoded tile lists may be read and vertex information for the tiles may be retrieved. In step 622, compressed tile lists may be utilized to perform primitive rendering on a tile basis. The exemplary steps may end at step 624.

In an embodiment of the invention, one or more processors and/or circuits in a graphics processing device, for example, the 3D pipeline 300 may be operable to generate coordinates within a view-space, for example, in the tiled view-space frame 400, for one or more vertices of one or more graphics primitives, for example, the triangle A 410. Indices, for example, 9, 12 and 20, that reference information about the one or more vertices and/or graphics primitives, for example, information within the table of vertices 450, may be differentially encoded in a list, for example, in the tile list 434. Furthermore, spatial coordinates, for example, x,y coordinates of the one or more vertices of the graphics primitives, for example, the triangle 410, may be differentially encoded in the list, for example, the tile list 434 or optionally another list for clipped primitive vertices. The differentially encoded indices and/or x,y coordinates may or may not be byte aligned. In this regard, the tile lists 430 may be utilized to reference the one or more vertices and/or the one or more graphics primitives during vertex shading, for example, during the tile rendering phase. A plurality of tiles may be defined within the view-space, for example, the tile (1, 0) 404 and/or the tile (1, 2) 406. The tile lists 430 may comprise one or more tile lists, for example, the tile list 432 that may be associated with the tile (1, 0) 404 and the tile list 434 that may be associated with the tile (1, 0) 404 and the tile (1, 2) 406 in the tiled view-space frame 400. The graphics primitives and/or vertices that overlap at least a portion of a tile defined in the view-space may be determined. For example, the triangle A 410 and triangle C 414 may overlap the tile (1, 2) 406.

In various instances, a plurality of graphics primitives and/or a plurality of vertices may overlap at least a portion of a tile defined in the view-space, for example, triangle A 410 and triangle C 414 overlap the tile (1, 2) 406. The graphics primitives may comprise a triangle, for example, the triangle 410. Moreover, the graphics primitives may comprise joined triangles that share one or more vertices, for example, the fan of triangles 510B and/or the strip of triangles 410C. Indices for vertices and/or vertex coordinates of the joined graphics primitives for example, the fan of triangles 510B, may be encoded in a list, for example, within the tile lists 430 and/or another list, without repeating the encoding for the shared one or more vertices. In this regard, once an absolute index for referencing information may be encoded in a list. Once coordinates for a shared vertex is encoded for a tile, the index and/or coordinates need not be explicitly repeated in the tile list. New view-space coordinates and/or corresponding weights of new vertices may be encoded in a list that may be associated with a tile defined in the view-space. For example, new coordinates and/or corresponding barycentric weights of new vertices of the fan of triangles 510B may be encoded in a list associated with a tile in the view-space frame 502. The new coordinates and/or the weights may be utilized for interpolating properties of the new vertices, for example, new vertices in the fan of triangles 510B, based on the information about the one or more vertices and/or the graphics primitives, for example, that may be stored in the table of vertices 450. The graphics rendering may be performed in a tile mode utilizing at least two phases comprising a tile binning phase and a tile rendering phase.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for compressing tile lists used for 3D rendering.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing graphics, the method comprising:
   in a graphics processing device:
   generating coordinates within a view-space for one or more vertices of at least one clipped primitive;
   defining the at least one clipped primitive as a plurality of triangles; and
   differentially encoding in a list, indices that reference information about said one or more vertices of the at least one clipped primitive, wherein said list is utilized to reference said one or more vertices and said at least one clipped primitive during graphics rendering.

2. The method according to claim 1, comprising defining a plurality of tiles within said view-space.

3. The method according to claim 1, wherein said list comprises one or more tile lists, wherein each tile list corresponds with a tile that is defined within said view-space.

4. The method according to claim 1, comprising differentially encoding in said list, spatial coordinates of said one or more vertices of the at least one clipped primitive.

5. The method according to claim 1, comprising encoding in a list, indices for and/or coordinates of one or more vertices of joined ones of said graphics primitives that share one or more of said vertices, without repeating said encoding for said shared one or more vertices.

6. The method according to claim 1, comprising performing said graphics rendering in a tile mode utilizing at least two phases comprising a tile binning phase and a tile rendering phase.

7. The method of claim 6, wherein the binning phase comprises binning the plurality of triangles.

8. The method according to claim 1, wherein the plurality of triangles is arranged in a fan pattern.

9. The method of claim 1, wherein each triangle of the plurality of triangles comprises at least one edge radiating from a single vertex.

10. A system tor processing graphics, the system comprising:
    one or more processors and/or circuits, wherein said one or more processors and/or circuits being operable to:
    generate coordinates within a view-space for one or more vertices of one or more graphics primitives;
    clip the one or more graphics primitives defining at least one clipped primitive;
    define the at least one clipped primitive as a plurality of triangles; and
    differentially encode in a list, indices that reference information about said one or more vertices of the at least one clipped primitive, wherein said list is utilized to reference said one or more vertices and the at least one clipped primitive during graphics rendering.

11. The system according to claim 10, wherein said one or more circuits are operable to define a plurality of tiles within said view-space.

12. The system according to claim 10, wherein said list comprises one or more tile lists, wherein each tile list corresponds with a tile that is defined within said view-space.

13. The system according to claim 10, wherein said one or more circuits are operable to determine which of said one or more graphics primitives and/or said one or more vertices overlap at least a portion of a tile defined within said view-space.

14. The system according to claim 10, wherein said one or more circuits are operable to differentially encode in said list, spatial coordinates of said one or more vertices of said one or more graphics primitives.

15. The system according to claim 10, wherein said one or more circuits are operable to encode in a list, indices for and/or coordinates of one or more vertices of joined ones of said graphics primitives that share one or more of said vertices, without repeating said encoding for said shared one or more vertices.

16. The system according to claim 10, wherein said one or more circuits are operable to encode in a list that is associated with a tile that is defined within said view-space, new view-space coordinates and/or corresponding weights of new vertices wherein said new coordinates and/or said weights are utilized for interpolating properties of said new vertices based on said information about said one or more vertices of said one or more graphics primitives.

17. The system according to claim 10, wherein said one or more circuits are operable to perform said graphics rendering in a tile mode utilizing at least two phases comprising a tile binning phase and a tile rendering phase.

18. The system according to claim 10, wherein the plurality of triangles defines a strip pattern.

19. The system according to claim 10, wherein each triangle of the plurality of triangles has at least one shared edge with another triangle of the plurality of triangles.

20. The system according to claim 10, wherein the plurality of triangles defines a sequence of triangles comprising a first plurality of triangles arranged in a strip pattern and a second plurality of triangles arranged in a fan pattern.

* * * * *